(12) United States Patent
Ooi et al.

(10) Patent No.: US 11,094,430 B2
(45) Date of Patent: Aug. 17, 2021

(54) ELECTRIC WIRE CONDUCTOR, COVERED ELECTRIC WIRE, AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Hayato Ooi, Yokkaichi (JP); Yasuyuki Otsuka, Yokkaichi (JP); Kinji Taguchi, Yokkaichi (JP); Toyoki Furukawa, Yokkaichi (JP); Tooru Tanji, Osaka (JP); Kei Sakamoto, Osaka (JP); Tetsuya Kuwabara, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/759,987

(22) PCT Filed: Nov. 6, 2018

(86) PCT No.: PCT/JP2018/041142
§ 371 (c)(1),
(2) Date: Apr. 28, 2020

(87) PCT Pub. No.: WO2019/093309
PCT Pub. Date: May 16, 2019

(65) Prior Publication Data
US 2021/0193348 A1    Jun. 24, 2021

(30) Foreign Application Priority Data

Nov. 8, 2017  (JP) .............................. JP2017-215294
May 16, 2018  (JP) .............................. JP2018-094963

(51) Int. Cl.
*H01B 7/04*     (2006.01)
*H01B 7/02*     (2006.01)
(Continued)

(52) U.S. Cl.
CPC ............. *H01B 7/04* (2013.01); *H01B 7/0045* (2013.01); *H01B 7/02* (2013.01); *H01B 7/0823* (2013.01);
(Continued)

(58) Field of Classification Search
CPC .... H01B 37/04; H01B 37/08; H01B 37/0823; H01B 37/0045; H01B 37/17; B60R 16/0207
See application file for complete search history.

(56) References Cited

U.S. PATENT DOCUMENTS

| 1,692,767 A | 11/1928 | Davis |
| 4,329,539 A * | 5/1982 | Tanaka .................... H01L 39/14 174/125.1 |

(Continued)

FOREIGN PATENT DOCUMENTS

| CN | 109791814 A | 5/2019 |
| JP | S49-79761 U | 7/1974 |

(Continued)

OTHER PUBLICATIONS

Jan. 8, 2019 Search Report Issued in International Patent Application No. PCT/JP2018/041143.
(Continued)

*Primary Examiner* — Timothy J Thompson
*Assistant Examiner* — Amol H Patel
(74) *Attorney, Agent, or Firm* — Oliff PLC

(57) ABSTRACT

An electric wire conductor having both flexibility and a space-saving property. Also provided are a covered electric wire and a wiring harness containing the electric wire conductor. An electric wire conductor contains a wire strand containing a plurality of elemental wires twisted together. The electric wire conductor has a flat portion in which a cross section intersecting an axial direction of the wire strand has a flat shape. Assuming a conductor cross-sectional area of the flat portion as s mm$^2$ and a vacancy ratio defined as a ratio of vacancies not occupied by the elemental wires in a cross section of the flat portion as v %, the conductor cross-sectional area and the vacancy ratio satisfies v>0.29 s+2.0. The covered electric wire contains electric wire conductor and an insulator covering the conductor. The wiring harness contains the covered electric wire.

21 Claims, 12 Drawing Sheets

(51) Int. Cl.

| | | |
|---|---|---|
| H01B 7/08 | (2006.01) | |
| H01B 7/17 | (2006.01) | |
| H01B 7/00 | (2006.01) | |
| H01B 13/00 | (2006.01) | |
| B60R 16/02 | (2006.01) | |

(52) U.S. Cl.
CPC .......... *H01B 7/17* (2013.01); *B60R 16/0207* (2013.01); *H01B 13/0006* (2013.01)

(56) References Cited

U.S. PATENT DOCUMENTS

| | | | |
|---|---|---|---|
| 4,473,716 A * | 9/1984 | Jesseman | B29C 53/14 156/50 |
| 4,980,517 A | 12/1990 | Cardas | |
| 5,430,256 A | 7/1995 | Taylor et al. | |
| 6,284,979 B1 * | 9/2001 | Malozemoff | H01L 39/143 174/125.1 |
| 10,658,092 B2 | 5/2020 | Ooi et al. | |
| 10,818,411 B2 | 10/2020 | Wakamatsu et al. | |
| 2005/0006135 A1 | 1/2005 | Nakayama | |
| 2005/0150680 A1 | 7/2005 | Sugihara et al. | |
| 2012/0261185 A1 | 10/2012 | Murao et al. | |
| 2017/0309373 A1 | 10/2017 | Tanaka et al. | |
| 2018/0114610 A1 | 4/2018 | Uegaki et al. | |
| 2019/0259511 A1 | 8/2019 | Ooi et al. | |

FOREIGN PATENT DOCUMENTS

| | | |
|---|---|---|
| JP | S52-074877 A | 6/1977 |
| JP | S59-130011 A | 7/1984 |
| JP | S63-158710 A | 7/1988 |
| JP | H5-198220 A | 8/1993 |
| JP | H8-249926 A | 9/1996 |
| JP | 2003-331655 A | 11/2003 |
| JP | 2009-245658 A | 10/2009 |
| JP | 2011-134667 A | 7/2011 |
| JP | 2014-130739 A | 7/2014 |
| JP | 2017-188431 A | 10/2017 |
| JP | 2017-224565 A | 12/2017 |
| WO | 2017/056278 A1 | 4/2017 |

OTHER PUBLICATIONS

Jan. 8, 2019 Search Report Issued in International Patent Application No. PCT/JP2018/041142.
Nov. 6, 2019 International Preliminary Report on Patentability Issued in International Patent Application No. PCT/JP2018/041142.
Jun. 21, 2019 International Preliminary Report on Patentability Issued in International Patent Application No. PCT/JP2018/041143.
U.S. Appl. No. 16/759,980, filed Apr. 28, 2020 in the name of Ooi et al.
Nov. 5, 2020 Notice of Allowance Issued in U.S. Appl. No. 16/759,980.
Mar. 24, 2021 Office Action issued in Indian Patent Application No. 202017021600.
Mar. 3, 2021 Office Action issued in Chinese Patent Application No. 201880070912.2.
May 18, 2021 Office Action issued in Japanese Patent Application No. 2019-552798.

* cited by examiner

Vacancy ratio 16%

Vacancy ratio 6%

Vacancy ratio 20%

Vacancy ratio 9%

Conductor cross-sectional area 60mm$^2$

Vacancy ratio 30%

Vacancy ratio 11%

Conductor cross-sectional area 15mm$^2$

ELECTRIC WIRE CONDUCTOR, COVERED ELECTRIC WIRE, AND WIRING HARNESS

TECHNICAL FIELD

The present invention relates to an electric wire conductor, a covered electric wire, and a wiring harness, and more specifically, to an electric wire conductor made of a wire strand, a covered electric wire containing an insulator on an outer periphery of the electric wire conductor, and a wiring harness including the covered electric wire.

BACKGROUND ART

A flat cable containing a flat-shaped conductor is commonly known. A flat cable occupies a smaller space for routing than a conventional electric wire configured with a conductor having a substantially circular cross section.

As described in Patent Literature 1, a flat rectangular conductor is often used as a conductor for conventional flat cable. The rectangular flat conductor is made of a single metal wire formed to have a rectangular cross section.

CITATION LIST

Patent Literature

Patent Literature 1: JP 2014-130739 A

SUMMARY OF INVENTION

Problems to be Solved by the Invention

A flat rectangular conductor made of a single metal wire has comparatively high flexibility, and easily bends in a height (thickness) direction of the flat cross section. However, in a width direction of the flat cross section, the conductor has low flexibility, and is too rigid to bend easily. Thus, the flat cable having the rectangular conductor made of a single metal wire hardly bends in the particular direction, which lowers workability of the cable upon routed.

The present invention has been made to solve the above problems, and an object of the present invention is to provide an electric wire conductor having both flexibility and a space-saving property, a covered electric wire, and a wiring harness including such an electric wire conductor.

Means of Solving the Problems

To achieve the objects and in accordance with the purpose of the present invention, an electric wire conductor according to the present invention contains a wire strand containing a plurality of elemental wires twisted together, the conductor having a flat portion where a cross-section of the wire strand intersecting an axial direction of the wire strand has a flat shape. Assuming a conductor cross-sectional area of the flat portion as $s$ mm$^2$ and a vacancy ratio defined as a ratio of vacancies not occupied by the elemental wires in a cross section of the flat portion as $v$ %, the conductor cross-sectional area and the vacancy ratio satisfies $v > 0.29 s + 2.0$.

The conductor cross-sectional area and the vacancy ratio preferably satisfy $v \geq 0.29 s + 2.5$.

Deformation ratios of the elemental wires from a circle in the cross-section of the flat portion are preferably lower at a part facing an outer periphery of the flat portion than at a center part of the flat portion. Further, the deformation ratios of the elemental wires from a circle in the cross-section of the flat portion at a part facing an outer periphery of the flat portion are preferably 65% or lower of deformation ratios of the elemental wires at a center part of the flat portion. Furthermore, the deformation ratios of the elemental wires from a circle in the cross-section of the flat portion at a part facing an outer periphery of the flat portion are preferably 20% or lower.

The electric wire conductor preferably contains a continuous vacancy in the cross-section of the flat portion which is capable of accommodating one or more of the elemental wires.

The cross-section of the flat portion preferably includes opposing edges along the width direction of the flat shape being parallel to each other. In this case, the deformation ratios of the elemental wires from a circle in the cross-section of the flat portion are preferably lower at end parts of the opposing sides of the flat portion than at the center part of the flat portion.

A length in the width direction of the flat shape of the flat portion is preferably three times or more larger than a length in the height direction intersecting the width direction.

The cross-section of the flat portion preferably has a quadrangular shape. Further, the cross-section of the flat portion preferably has a rectangular shape.

The electric wire conductor preferably contains the flat portion and a low-flatness portion having a flatness lower than the flat portion, the flat portion and the low-flatness portion continuously disposed in the axial direction.

The number of elemental wires contained in the wire strand is preferably 50 or more.

The wire strand is preferably made of copper or a copper alloy and has a conductor cross-sectional area of 100 mm$^2$ or larger, or made of aluminum or an aluminum alloy and has a conductor cross-sectional area of 130 mm$^2$ or larger.

In the flat portion of the electric wire conductor, the wire strand is preferably pressed from a first direction and a second direction opposing to each other, and from a third direction and a fourth direction opposing to each other and intersecting the first direction and the second direction.

A covered electric wire according to the present invention contains the electric wire conductor as described above and an insulator covering the electric wire conductor.

A wiring harness according to the present invention contains the covered electric wire as described above.

Here, the wiring harness preferably contains a plurality of the above-mentioned covered electric wires aligned along at least one of a width direction of the electric wire conductor and a height direction intersecting the width direction. In this case, the wiring harness preferably contains at least one of a heat dissipation sheet disposed between the plurality of the covered electric wires and a heat dissipation sheet commonly contacting the plurality of the covered electric wires.

Further, the plurality of the covered electric wires are preferably aligned at least along the height direction. In this case, interposing sheets made of a heat dissipation material are preferably disposed between the plurality of the covered electric wires aligned along the height direction. Further, a connection member made of a heat dissipation material is preferably disposed to connect the interposing sheets mutually.

Otherwise, the plurality of the covered electric wires are preferably aligned at least along the width direction, where the insulator is made of insulation films and bonded each other by fusion or by adhesive while sandwiching the electric wire conductors aligned along the width direction all together in between the height direction. The electric wire conductors are preferably insulated mutually by the insulation film or the adhesive.

The wiring harness preferably contains a large cross-section covered electric wire and a plurality of small cross-section covered electric wires each having a conductor cross-sectional area smaller than the large cross-section covered electric wire, where the small cross-section covered electric wires have a uniform height, and the large cross-section covered electric wire and the small cross-section covered electric wires are stacked in the height direction with the small cross-section covered electric wires are aligned along the width direction.

The wiring harness is preferably disposed along an outer periphery of a columnar member. Alternatively, the wiring harness is preferably housed in a hollow part of a hollow tubular member having an opening along the longitudinal direction.

Further, the wiring harness is preferably disposed under the floor of an automobile to constitute a power-supply trunk line. Furthermore, the wiring harness preferably constitutes the ceiling or the floor of an automobile. In these cases, the wiring harness preferably contains a plurality of the above-mentioned covered electric wires which are aligned at least along the width direction of the electric wire conductor, have uniform length in a height direction intersecting the width direction, and are disposed between an interior member and a sound absorbing member of the automobile so as to dispose the width direction along surfaces of the interior member and the sound absorbing member.

The wiring harness preferably contains a first covered electric wire and a second covered electric wire, where the first covered electric wire is the above described covered electric wire having the electric wire conductor made of aluminum or an aluminum alloy, and the second covered electric wire has the electric wire conductor made of copper or a copper alloy having a lower flatness and a smaller conductor cross-sectional area than the electric wire conductor of the first covered electric wire. In this case, the conductor cross-sectional area of the second covered electric wire is preferably 0.13 mm$^2$ or smaller.

Advantageous Effects of Invention

The electric wire conductor according to the present invention has high flexibility because it is formed of a wire strand but not of a single wire. Further, the flat portion having the flat cross section contributes to reduce a space required for routing as an electric wire compared with a conventional electric wire conductor having a substantially circular cross section. Furthermore, in a case where the conductor cross-sectional area is made large, a length in the height direction can be kept small by increasing a length in the width direction of the flat shape, whereby the conductor cross-sectional area can be increased while maintaining the space-saving property.

In the electric wire conductor according to the present invention, a vacancy ratio (v %) of the flat portion defined by the relation with a conductor cross-sectional area (s mm$^2$) of the flat portion is larger than the lowest value of 0.29 s+2.0, whereby the electric wire conductor has effectively high flexibility although the cross section of the electric wire conductor is flat. Accordingly, the electric wire conductor can provide especially great freedom in routing. Further, by obtaining such high vacancy ratio, formation of a sharp protrusion (burr) which might be formed on the peripheral part of the electric wire conductor due to high compression of the electric wire conductor can be prevented.

In the case where the conductor cross-sectional area and the vacancy ratio satisfy v≥0.29 s+2.5, the electric wire conductor especially keeps high flexibility effectively.

When the deformation ratios of the elemental wires from a circle in the cross section of the flat portion are lower at the part facing the outer periphery of the flat portion than at the center part of the flat portion, intensive deformations of the elemental wires located in the peripheral part and application of a large load to the wires due to the deformation for forming the wire strand to have a flat cross section can be prevented. Further, formation of an irregular structure can be prevented including burrs to be formed on the peripheral part of the electric wire conductor due to the deformation of the elemental wires.

When the deformation ratios of the elemental wires from a circle in the cross section of the flat portion at the part facing the outer periphery of the flat portion are 65% or lower of the deformation ratios of the elemental wires at the center part of the flat portion, concentration of the deformation and the load on the peripheral part of the wire strand, and formation of the irregular structure on the surface of the electric wire conductor are effectively prevented.

When the deformation ratios of the elemental wires from a circle in the cross section of the flat portion at the part facing the outer periphery of the flat portion are 20% or lower, concentration of the deformation and the load on the peripheral part of the wire strand, and formation of the irregular structure on the surface of the electric wire conductor are effectively prevented.

When the electric wire conductor includes a continuous vacancy in the cross section of the flat portion which is capable of accommodating one or more of the elemental wires, the electric wire conductor can bend flexibly through migration of the elemental wire to the vacancy, thus the electric wire conductor effectively achieves high flexibility.

When the cross section of the flat portion includes opposing edges being parallel to each other along the width direction of the flat shape, a large space can be effectively provided on the outside in the height (i.e., thickness) direction of the electric wire to be routed, which leads to high space-saving property of the electric wire. In particular, when a plurality of electric wires are stacked when routed, an unnecessary large space is not required.

In this case, when the deformations ratio of the elemental wire from a circle in the cross section of the flat portion at the end parts of the opposing edges being parallel to each other of the flat portion are lower than the deformation ratios of the elemental wires at the center part of the flat portion, the concentration of deformation and load on the end parts of the electric wire conductor can be prevented. Further, an irregular structure including burrs tends to be formed especially on the end parts of the opposing edges being parallel to each other within the peripheral part of the electric wire conductor; however, by keeping the deformation ratios of the elemental wire at the end parts small, the formation of the irregular structure including burrs on the edge parts can be prevented effectively.

When the length in the width direction of the flat shape of the flat portion is three times or more larger than the length in the height direction intersecting the width direction, the electric wire conductor has high flexibility while having high space-saving property in the height direction resulting from the smaller length in the height direction with respect to the length in the width direction.

Further, when the cross section of the flat portion is a quadrangular shape, useless spaces between electric wires are reduced when a plurality of the electric wires are aligned or stacked, whereby the electric wires can be assembled densely.

Furthermore, when the cross section of the flat portion is a rectangular shape, useless spaces between the electric wires are especially reduced when aligning or stacking a plurality of the electric wires, achieving the remarkably excellent space-saving property.

When the electric wire conductor contains the flat portion and the low-flatness portion having a flatness lower than the flat portion that are disposed continuously in the axial direction, the portions with the different flatness may be disposed in one electric wire conductor, whereby the conductor has the properties of the both portions simultaneously without a process such as joining. For example, arranging the flat portion in a center part of the electric wire conductor, and arranging the low-flatness portions having a substantially circular cross section on both ends of the flat portion can achieve both the space-saving property at the center part and convenience in attaching members such as terminals to the end parts of the electric wire conductor.

When the number of elemental wires contained in the wire strand is 50 or more, the wire strand can be effectively formed into a flat cross section without drastically deforming each elemental wire by utilizing a change in the relative arrangement of the elemental wires, while leaving large vacancies between the elemental wires. Thus, the electric wire conductor effectively achieves both the space-saving property and the flexibility.

When the wire strand is made of copper or a copper alloy and has a conductor cross-sectional area of 100 mm$^2$ or more, or made of aluminum or an aluminum alloy and has a conductor cross-sectional area of 130 mm$^2$ or more, the space-saving property and flexibility achieved by the flat cross-sectional shape are particularly effective. For the electric wire conductor having a large cross-sectional area of 100 mm$^2$ or more, or 130=$^2$ or more, if the cross section is substantially circular, a large space is required for routing due to largeness of the diameter and an opposing force against bending becomes large. However, when the cross section is made flat, the electric wire conductor having such a large cross-sectional area can achieve the space-saving property as well as the high flexibility especially for the bending in the height direction.

In addition, in the flat portion of the electric wire conductor, when the wire strand is pressed from the first direction and the second direction opposing to each other, and from the third direction and the fourth direction opposing to each other and intersecting the first direction and the second direction, the electric wire conductor can be effectively formed to have a substantially quadrangle cross section, thus achieving the excellent space-saving property.

Since the covered electric wire according to the present invention contains the electric wire conductor as described above, the covered electric wire has both flexibility resulting from the electric wire conductor being a wire strand and space-saving property resulting from the electric wire conductor having a flat shape. Therefore, in the case where the plurality of the covered electric wires are aligned or stacked when routed, the routing can be carried out with high degree of freedom while saving the space.

The outer surface of the electric wire conductor is a flat surface along the width direction of the flat shape, whereby an insulator is easily formed on each portion of the outer periphery of the electric wire conductor to have a uniform thickness. Accordingly, the insulator may be easily formed on each portion of the outer periphery of the electric wire conductor to have the smallest thickness required from the viewpoint of wear resistance. Further, the outer surface of the insulator is also formed to have a flat surface. Accordingly, even if the covered electric wire contacts an external object, the contact tends to occur on the entire flat surface, and a load due to the contact can be dispersed into a wide area. Thus, the insulator can obtain high wear resistance.

As the wiring harness according to the present invention contains the covered electric wire containing the flat electric wire conductor as described above, it has excellent flexibility and space-saving property, and thus can be suitably used as a wiring material in a limited space such as an automobile.

Here, when the wiring harness contains a plurality of the covered electric wires as described above, and the plurality of the covered electric wire are aligned along at least one of the width direction of the electric wire conductor and the height direction intersecting the width direction, the wiring harness can be formed while reducing the spaces between the plurality of the covered electric wires, thus having the remarkably high space-saving property.

In this case, when the wiring harness contains at least one of the heat dissipation sheets interposed between the plurality of the covered electric wires and the heat dissipation sheet commonly contacting the plurality of the covered electric wires, even when the plurality of the covered electric wires are densely arranged to be close to each other utilizing the space-saving property resulting from the flat shape, the influence of heat generated upon application of an electric current can be suppressed.

Further, when the plurality of the covered electric wires are arranged at least along the height direction, the covered electric wires can be effectively routed in a variety of small spaces such as a thin space by utilizing the arrangement of the covered electric wires in the height direction.

In this case, when the interposing sheets made of the heat dissipation material are disposed between the plurality of the covered electric wires aligned along the height direction and the connection member made of the heat dissipation material is disposed to mutually connect the plurality of the interposing sheets, the following effect is obtained: the interposing sheets disposed between the covered electric wires effectively promote heat dissipation though outward dissipation of the heat generated upon application of a current, which tends to be difficult in a case where the plurality of the covered electric wires are arranged closely making their flat wide surfaces to oppose one another. Further, the connection member disposed to mutually connect the plurality of the interposing sheets also effectively promotes heat dissipation.

When the plurality of the covered electric wires are aligned at least along the width direction, the insulators made of an insulation film are adjoined each other by fusing or adhesion and sandwich the electric wire conductors aligned along the width direction all together from the top and the bottom in the height direction, and the electric wire conductors are insulated by the insulation film or an adhesive, an insulator covering is easily formed on each electric wire conductor with the multiple electric wire conductors each having the flat portion are aligned along the width direction to constitute the wiring harness. Comparing with the case where each electric wire conductor is individually covered with an insulator, the space-saving property of the wiring harness is enhanced since the thickness of an area occupied by the insulator covering becomes small and formation of vacancies formed between the adjacent insulator coverings is eliminated.

When the wiring harness contains a large cross-section covered electric wire and a plurality of small cross-section covered electric wires as the covered electric having the flat shape as described above, where the large cross-section covered electric wire has a larger cross section than the small cross-section covered electric wire, the small cross-section covered electric wires are uniform in height, and the large cross-section covered electric wire and the small cross-section covered electric wires are stacked in the height direction with the small cross-section covered electric wires are aligned along the width direction, the small cross-section covered electric wires can be stably disposed by utilizing the wide outer surface of the large cross-section covered electric wire, constituting the wiring harness excellent in space-saving property.

When the wiring harness is disposed along the outer periphery of a columnar member, or the wiring harness is housed in the hollow part of a hollow tubular member having an opening along the longitudinal direction, the columnar member or the tubular member can be used for supporting the wiring harness, whereby the routing space of the wiring harness is effectively reduced.

Further, when the wiring harness is disposed under the floor of an automobile to constitute the power-supply trunk line, compared with a conventional power-supply trunk line using a copper plate, the productivity can be enhanced and the fatigue fracture due to the engine vibration, for example, can be suppressed.

When the wiring harness constitutes the ceiling or the floor of an automobile, the space in the automobile can be further effectively used to provide a wiring route, and the high heat dissipation performance can be achieved also in the case of applying a large electric current. Further, a ceiling surface or a floor surface of any shape can be formed in accordance with the arrangement of the covered electric wires.

In these cases, the wiring harness may contain the plurality of covered electric wires as described above which are aligned at least along the width direction of the electric wire conductor, have uniform length in the height direction intersecting the width direction, and are disposed between the interior member and the sound absorbing member of the automobile so as to dispose the width direction along the surfaces of the interior member and the sound absorbing member. In this case, the space between the interior member and the sound absorbing member can be effectively used for routing the wiring harness while the distance between the interior member and the sound absorbing member is kept small. Further, since the height of the plurality of covered electric wires is uniform, the irregular structure of the covered electric wire hardly influences a surface shape of the interior member or a sound absorbing property of the sound absorbing member.

Further, when the wiring harness contains the first covered electric wire and the second covered electric wire, in which the first covered electric wire is the above described covered electric wire having the electric wire conductor made of aluminum or an aluminum alloy, and the second covered electric wire has the electric wire conductor made of copper or a copper alloy having a lower flatness and a smaller conductor cross-sectional area than the electric wire conductor of the first covered electric wire, the space occupied by the first covered electric wire, which tends to have a large cross-sectional area because of the low electrical conductivity of aluminum and the aluminum alloy, can be reduced, and simultaneously, characteristics of the second covered electric wire brought about by the copper or copper alloy such as the high electrical conductivity in the second covered electric wire can be used.

In this case, when the conductor cross-sectional area of the second covered electric wire is 0.13 mm$^2$ or smaller, the entire wiring harness can effectively have a high space-saving property.

BRIEF DESCRIPTION OF DRAWINGS

In FIGS. 4B to 4D, elemental wires are omitted.

FIG. 5A illustrates a case where the covered electric wires are aligned in a width direction, and FIG. 5B illustrates a case where the covered electric wires are aligned in a height direction.

In FIGS. 6A to 6C, a plurality of small cross-section covered electric wires are stacked on a large cross-section covered electric wire, and the plurality of small cross-section covered electric wires have different conductor cross-sectional areas in each Figure.

FIG. 8A illustrates a routing structure with a cylindrical member, and FIG. 8B illustrates a routing structure with a tubular member having a channel-shaped cross section.

FIGS. 9A to 9C each show a wire having a conductor cross-sectional area of 60 mm$^2$, and the compression ratios are the following order from the lowest: FIGS. 9A, 9B, and 9C.

FIGS. 9D to 9F each show a wire having a conductor cross-sectional area of 15 mm$^2$, and the compression ratios are the following order from the lowest: FIGS. 9D, 9E, and 9F.

FIG. 11A shows a raw wire strand before pressing (the conductor cross-sectional area: 60 mm$^2$). FIG. 11B to 11E each show electric wire conductor after pressing. The conductor cross-sectional area is 60 mm$^2$ in FIGS. 11B and 11C, 30 mm$^2$ in FIG. 11D, and 15 mm$^2$ in FIG. 11E. The compression ratios are different in FIGS. 11B and 11C.

FIGS. 13A to 13C show samples 1 to 3, respectively.

DESCRIPTION OF EMBODIMENTS

Hereinafter, detailed descriptions of an electric wire conductor, a covered electric wire, and a wiring harness according to one embodiment of the present invention will be provided with reference to FIGS. 1 to 13. A covered electric wire according to one embodiment of the present invention contains an electric wire conductor according to one embodiment of the present invention and an insulator covering the conductor. In addition, a wiring harness according to one embodiment of the present invention contains a plurality of covered electric wires assembled together containing the covered electric wire according to one embodiment of the present invention.

[Electric Wire Conductor]

Figure 1:
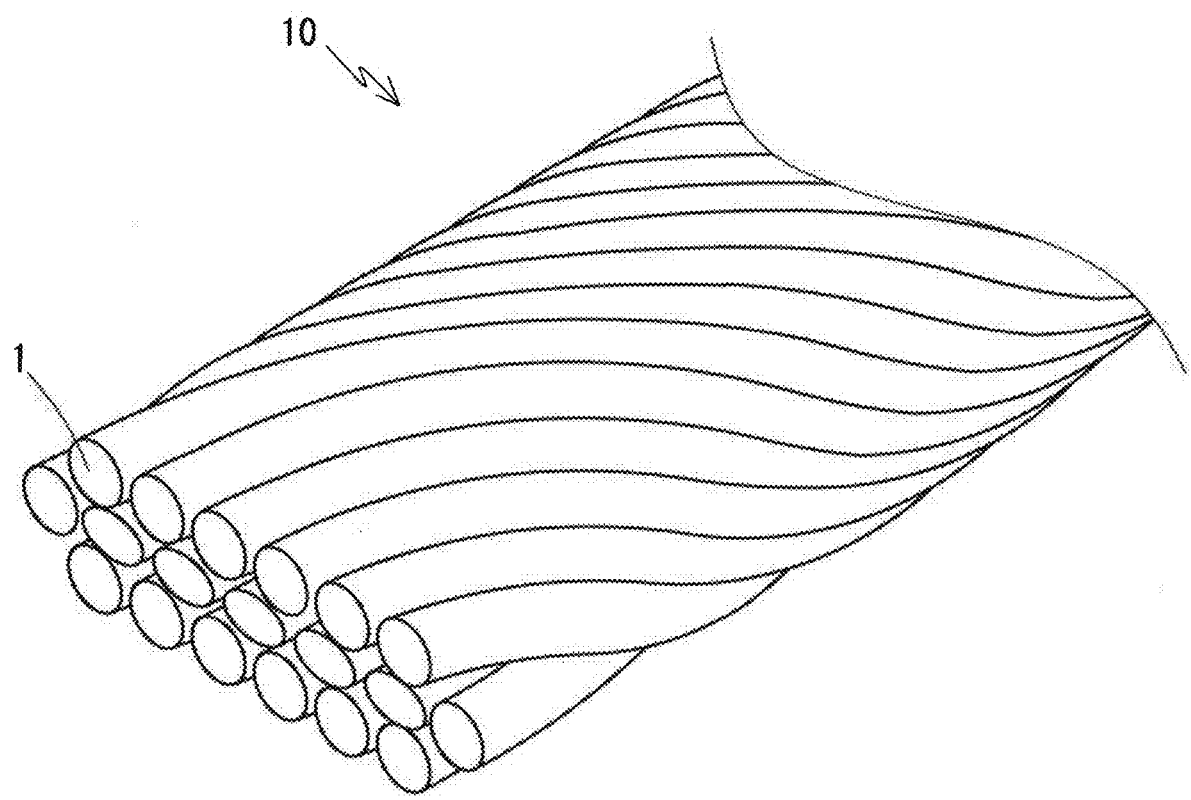
FIG. 1 is a perspective view of an electric wire conductor according to one embodiment of the present invention.
Figure 2:
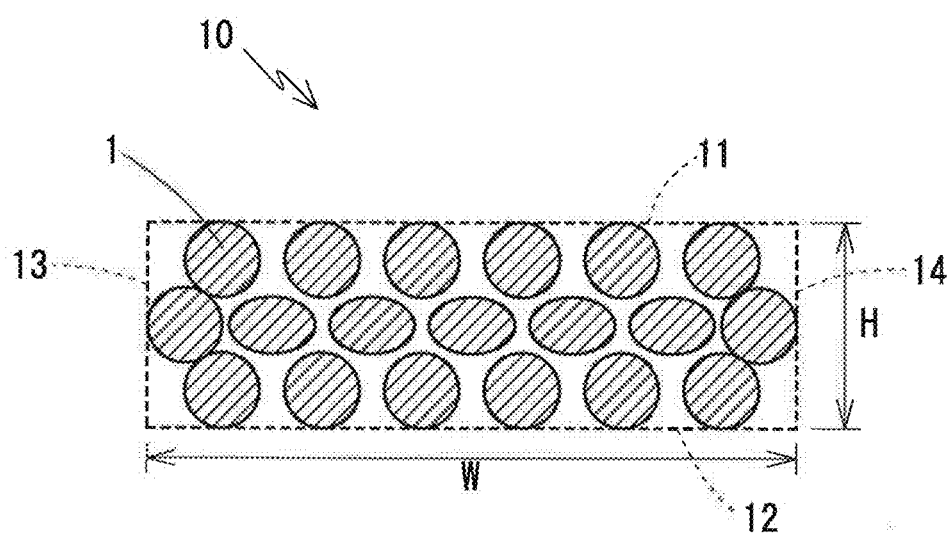
FIG. 2 is a cross-sectional view of the electric wire conductor.

FIG. 1 is a perspective view of an external appearance of an electric wire conductor 10 according to one embodiment of the present invention. FIG. 2 shows a cross section perpendicularly intersecting an axial direction (longitudinal direction) of the electric wire conductor 10.

(1) Cross-Sectional Shape of the Electric Wire Conductor

The electric wire conductor 10 is configured as a wire strand containing a plurality of elemental wires 1 twisted together. Further, at least a part of the electric wire conductor 10 along the axial direction has a flat outer shape. In other words, the electric wire conductor 10 has a flat portion where a cross section perpendicularly intersecting the axial direction of the electric wire conductor 10 is flat. In the present embodiment, the entire electric wire conductor 10 along the axial direction is formed as the flat portion.

Here, the concept that "the cross section of the electric wire conductor 10 is flat" describes a state where a width W, which is a length of the longest line among lines that pass through the cross section in parallel to edges constituting the cross section and encompass the entire cross section, is larger than a height H, which is a length of a line perpendicular to the above-mentioned longest line and encompass the entire cross section. In the cross section of the electric wire conductor 10 according to the present embodiment shown in FIG. 2, and in each of the cross sections of the electric wire conductors in the embodiments shown in FIGS. 4A to 4D, the width W is larger than the height H.

While the cross section of the electric wire conductor 10 may have any specific shape as long as it is flat, the cross section of the electric wire conductor 10 in the present embodiment has opposing edges 11 and 12 that are parallel to each other along a direction of width W (width direction x) of the flat shape. In other words, two parallel lines 11 and 12 can be drawn in the width direction x, so as to circumscribe the outer elemental wires 1 forming the cross section of the electric wire conductor 10. In the present description, concerning the shape of the electric wire conductor 10, concepts for describing relationships among lines and surfaces such as parallel and vertical may include a deviation with reference to the concepts in geometry such as a deviation at an angle of approximately plus or minus 15 degrees, or an R shape where each corner is rounded. In addition, concepts of edges, straight lines, plain surfaces, or the like may include a curved line or a curved surface with a deviation at an angle of approximately plus or minus 15 degrees from a geometric straight line or a plain surface.

In the present embodiment, the cross section of electric wire conductor 10 has a rectangular shape. In the Figures, the number of elemental wires 1 contained in the electric wire conductor 10 is reduced for easier understanding.

As the electric wire conductor 10 according to the present embodiment has a flat cross section, when it is routed in a form of the covered electric wire, for example, a space necessary for routing may be made smaller than a case of routing an electric wire having a substantially circular cross section of the same conductor cross-sectional area as the electric wire conductor. In other words, spaces around an electric wire in which other electric wires or other members are not allowed to be disposed can be reduced. In particular, a space occupied by the electric wire in a height direction y can be made smaller. Thus, the electric wire effectively achieves a space-saving property. Consequently, other electric wires or other members can be sufficiently disposed in a space vertically provided in the height direction (±y direction) outside of the electric wire. For example, in the case of routing the electric wire along a surface for routing, when a flat surface of the electric wire, that is, a surface parallel to the width direction x is arranged along the surface for routing, it is possible to effectively provide a space above the electric wire (in a direction opposing to the surface for routing, having the electric wire therebetween). Further, in a case where a conductor cross-sectional area of the electric wire conductor 10 is desired to be large, the space-saving property in the height direction y can be maintained by making the width W large while keeping the height H small.

In particular, the electric wire conductor 10 having opposing edges 11 and 12 parallel to the width direction x in its cross section can provide a large space vertically in the height direction (±y direction) outside the routed electric wire, whereby an excellent space-saving property is achieved. Especially, in the case of assembling a plurality of electric wires by stacking one electric wire on another electric wire, spaces between the plurality of electric wires along the height direction y can be reduced. Here, the concept of "assembling a plurality of electric wires" includes both of a configuration where a plurality of electric wires are integrally bundled with an insulation material, for example, and a configuration where a plurality of independent electric wires are closely disposed.

Furthermore, the electric wire conductor 10 having a rectangular cross section can provide a large space vertically (±y direction) and laterally (±x direction), whereby the space-saving property is further improved. Especially, in the case of assembling the plurality of electric wires with stacking one electric wire on another electric wire, or with aligning one electric wire laterally to another electric wire, spaces between the plurality of electric wires along the height direction y and the width direction x can be reduced.

As described above, the electric wire conductor 10 according to the present embodiment contains the wire strand containing a plurality of elemental wires 1 twisted together, and the wire strand has a flat outer shape. Therefore, the electric wire conductor 10 has excellent flexibility in each direction. Patent Literature 1 discloses a rectangular conductor that has flexibility in the height direction to a certain degree, but shows low flexibility in the width direction and is too rigid to bend easily in the width direction. In contrast, the electric wire conductor 10 according to the present embodiment including the wire strand has the excellent flexibility and easily bends in the width direction x as well as the height direction y.

Thus, the electric wire conductor 10 according to the present embodiment can achieve both the flexibility, which provides freedom in routing, and the space-saving property.

In an automobile, for example, due to recent high functionalization, the number of electric wires and components to be disposed is increasing. Also, a larger electric current is demanded for vehicles such as electric vehicles, which results in enlargement of a diameter of the electric wire, whereby a space for routing individual electric wires has been reduced. However, the electric wire conductor 10 according to the present embodiment can effectively use a small space when routed because of the space-saving property and the excellent flexibility. In the case of assembling a great number of electric wires, or using an electric wire having a large conductor cross-sectional area, this advantage is especially enhanced.

Figure 4A:
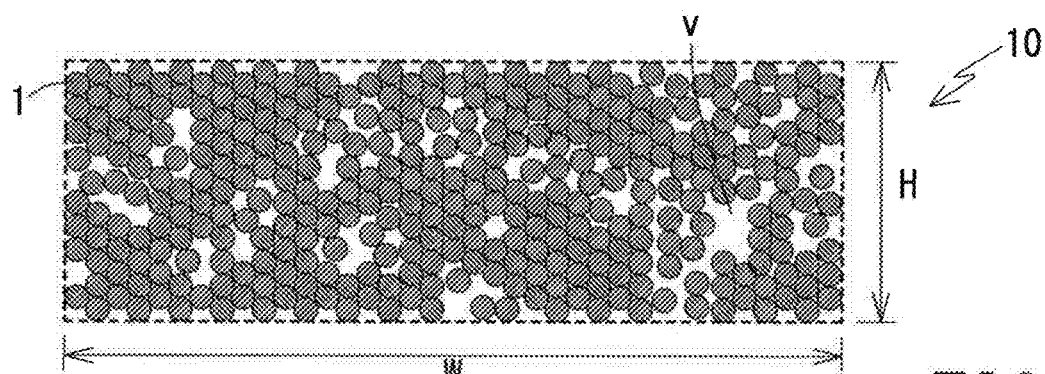
FIGS. 4A to 4D are views showing a variety of cross-sectional shapes of the electric wire conductor, and FIGS. 4A to 4D respectively show different shapes.
Figure 4B:
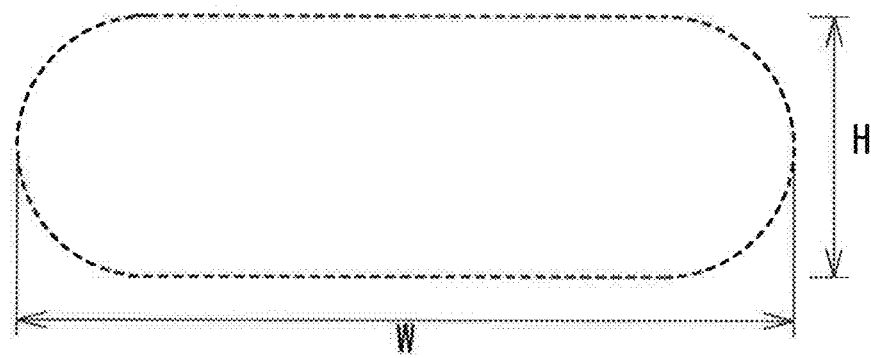
Figure 4C:
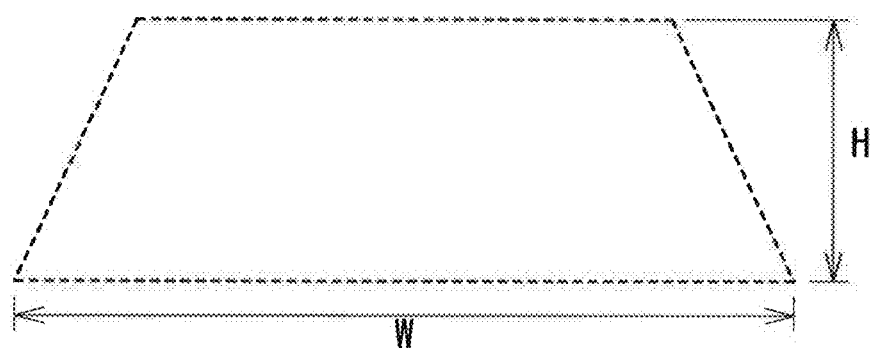
Figure 4D:
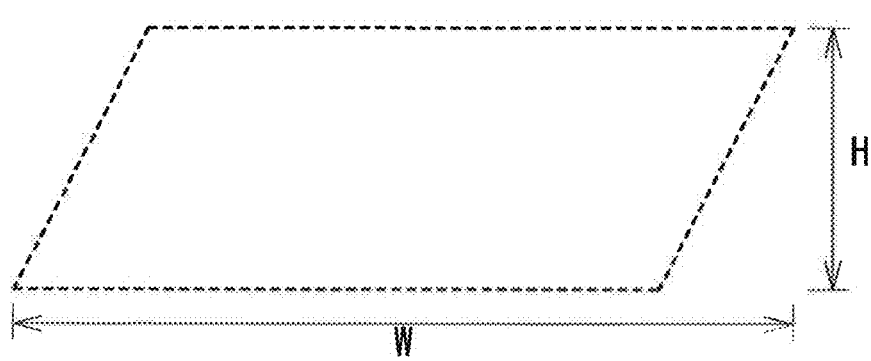

In the above-described embodiment, the electric wire conductor 10 has a rectangular cross section. However, as described above, the cross section of the electric wire conductor 10 may be of any shape as long as it is flat. FIGS. 4B to 4D show other examples of the cross-sectional shape. Here, in FIGS. 4B to 4D, the elemental wires 1 are omitted to show only the outer shape of the cross section, that is, a circumscribed edges which approximate cross sections of the electric wire conductors. FIG. 4B shows a cross section in an ellipse shape (a shape of a rectangle with half circles attached to both ends). As a cross section in a quadrangle shape other than the above-mentioned rectangular shape, FIG. 4C shows a cross section in a trapezoidal shape, and FIG. 4D shows a cross section in a parallelogram shape. Since the electric wire conductor 10 has a quadrangle cross section, a great number of electric wire conductors 10 may be disposed in the height direction y and the width direction x with small spaces, which contributes to the excellent space-saving property for assembling a great number of electric wires. This advantage is especially remarkable when the cross-sectional shape is a rectangle as described above.

(2) Vacancy in the Cross Section of the Electric Wire Conductor

Further, the electric wire conductor 10 according to the present embodiment has a vacancy ratio at the cross section of the flat portion which is higher than a predetermined lowest value defined according to the conductor cross-sectional area. The vacancy ratio at the cross section of the electric wire conductor 10 is defined as, within the cross section of the electric wire conductor 10 perpendicularly intersecting the axial direction, a proportion of an area of vacancy not occupied by the elemental wires 1 to an entire area of the whole electric wire conductor 10, that is, an area of a region surrounded by the outline of the entire electric wire conductor 10. The conductor cross-sectional area is an area of a region occupied by the elemental wires within the cross section of the electric wire conductor 10.

The vacancy ratio required for allowing the electric wire conductor 10 to have sufficient flexibility varies depending on the conductor cross-sectional area. As the conductor cross-sectional area becomes large, the electric wire conductor 10 becomes hard to bend, with the result that the conductor 10 needs to have high vacancy ratio to obtain high flexibility. As will be described in Examples below, a linear relation exists between a conductor cross-sectional area and a required vacancy ratio. When the relation represented by the following formula (1), where the vacancy ratio of the cross section of the electric wire conductor 10 is v % and the conductor cross-sectional area is s mm$^2$, is satisfied, the electric wire conductor 10 can obtain sufficient flexibility:

$$V > 0.29\, s + 2.0 \tag{1}$$

As described above, the electric wire conductor 10 has high flexibility both in the height direction y and the width direction x because of its flat shape, and it can easily bend. By having sufficient vacancy defined by the above formula (1) in the cross section of the electric wire conductor 10, the elemental wires 1 can move in the electric wire conductor 10 using the vacancy when the electric wire conductor 10 bends along the height direction y or the width direction x, so that the electric wire conductor 10 can bend more easily. Thus, the flexibility of the electric wire conductor 10 is improved.

By satisfying the relation indicated by the above formula (1), the electric wire conductor 10 according the present embodiment obtains high flexibility and suppresses an unnecessary irregular structure such as burrs from formed on the peripheral part of the conductor. As will be described later, when the electric wire conductor 10 is formed, for example, by pressing a raw wire strand 10', as the compression ratio becomes high, the vacancy ratio of the cross section of the electric wire conductor 10 becomes low and the irregular structure such as burrs easily formed on the peripheral part of the conductor. In other words, the electric wire conductor 10 with little irregular structure such as bars has a high vacancy ratio and achieves high flexibility.

From the viewpoint of further increasing flexibility of the electric wire conductor 10, the vacancy ratio preferably satisfies a relation represented by the following formula (2):

$$V \geq 0.29\, s + A \tag{2}$$

where A is a constant number, and A=2.5. The electric wire conductor 10 achieves especially high flexibility when A=3.5 in the above formula (2).

When preferable vacancy ratios (v %) are represented by numeric values according to the conductor cross-sectional area (s mm$^2$), the values will be as follows:

S≤15 mm$^2$: v≥6%, preferably v≥8%
15 mm$^2$<s≤30 mm$^2$: v≥11%, preferably v≥12%
30 mm$^2$<s≤50 mm$^2$: v≥16%, preferably v≥18%
50 mm$^2$<s≤60 mm$^2$: v≥19%, preferably v≥21%

The highest value of the vacancy ratio is not particularly limited. However, from the viewpoint of easiness in forming the wire strand 10 having a flat shape such as by pressing, and maintaining the flat shape, it is preferable that the vacancy ratio satisfies the following formula (3):

$$v \leq 0.29\, s + B \tag{3}$$

where B is a constant number, and B=11.

In the cross section of the electric wire conductor 10, small vacancies are provided in a region between each of the elemental wires 1. The vacancy ratio as defined above is a ratio of the area of these small vacancies in total with respect to the cross-sectional area of the electric wire conductor 10. When the total area of these small vacancies is equal to or more than the predetermined proportion in the cross section of the electric wire conductor 10, the flexibility of the electric wire conductor 10 is improved. In addition, sizes of the respective vacancies in the region between each of the elemental wires 1 also contributes improvement in flexibility of the electric wire conductor 10. In other words, a state where vacancies of a certain size are provided in the cross section of the electric wire conductor 10 as a continuous region can improve the flexibility of the electric wire conductor 10 more effectively than a state where minute vacancies are evenly spread over the cross section of the electric wire conductor 10. Specifically, the cross section of the electric wire conductor 10 preferably contains a continuous vacancy such that one or more, two or more, or three or more of the elemental wires 1 can be accommodated therein. This is because the elemental wires 1 moving into such a large vacancy enables flexible bending of the electric wire. Here, an elemental wire 1 used for judging whether the certain vacancy is capable of accommodating the elemental wire may be an elemental wire 1 surrounding the vacancy, or an elemental wire having a circular cross section with the same cross-sectional area as that of any elemental wire 1 forming the electric wire conductor 10. For example, in FIG. 4A, a vacancy indicated by a reference sign v is capable of accommodating two or more of the elemental wires. Even where continuous vacancies with size and shape which is capable of accommodating the elemental wires 1 are not formed in the cross section of the elemental wire conductor 10, it is still preferable that continuous vacancies having the size of an area in which one or more, two or more, or three or more of the elemental wires, when converted into the cross-sectional area of the elemental wire 1, are formed in the cross section of the electric wire conductor 10.

For calculation of the area of the electric wire conductor 10 and the area of the vacancies, the electric wire conductor 10 or the covered electric wire 20 having the insulator 21 on the outer periphery of the electric wire conductor 10 may be subjected to processes such as cutting and polishing to obtain a cross section, and then, such a cross section is photographed for actual measurement. In the preparation of the cross section, the electric wire conductor 10 and the covered electric wire 20 may be embedded in transparent resin for example prior to the operation including cutting as appropriate, to prevent a change in the shape or the area of the vacancies due to the operation including cutting. For preparing a sample that enables accurate evaluation of the state of the cross section of the vacancies, the electric wire conductor 10 or the covered electric wire 20 is preferably put, at the time of embedded in resin, in a container with the flat surface of the electric wire conductor 10 facing the container. Further, upon embedding, the cross-section polishing of the sample is preferably performed to a position away from the cut surface to form a sample for evaluation. Further, the area of the electric wire conductor 10 and the area of the vacancy may be evaluated for the entire cross-section of the electric wire conductor 10, or alternatively, in order to eliminate influence of the irregular structure in an outermost periphery of the electric wire conductor 10, the areas of the electric wire conductor 10 and the vacancies may be evaluated for an inner region where the outermost periphery of the electric wire conductor 10 is excluded, instead of evaluating the whole cross section if the elemental wires 1 are sufficient in number such as equals to or more than 50.

(3) Cross-Sectional Shape of Each Elemental Wire

For the electric wire conductor 10 according to the present embodiment, the cross-sectional shape of each elemental wire 1 constituting the electric wire conductor 10 may be of any shape as long as the outer shape of the entire electric wire conductor 10 is flat. A conventional electric wire having a substantially circular cross section may be employed as the elemental wire 1 in the present embodiment. However, at least a part of the plurality of elemental wires 1 may have cross sections of shapes deviated from a circle, such as flat shapes. As will be described later, when a raw wire strand 10' is pressed into a flat shape, at least a part of the elemental wires 1 may be deformed into flat shapes, depending on, for example, the material constituting the elemental wires 1.

For the electric wire conductor 10 according to the present embodiment, in the cross-section perpendicularly intersecting the axial direction, deformation ratios of the elemental wires 1 are lower at a peripheral part facing the outer periphery of the electric wire conductor 10 than at a center part which is located inside of the peripheral part. FIGS. 1 and 2 schematically show distribution of the deformation ratio of such elemental wires 1.

Here, the deformation ratio of an elemental wire 1 is an index showing a degree of deviation from a circle for a cross section of a certain elemental wire 1. For an elemental wire 1 actually contained in the electric wire conductor 10, a longest diameter L is defined as a length of the longest line laterally crossing the cross section, and a diameter R is defined as a diameter of a circle having the same area as the cross-sectional area of the elemental wire 1. Then, a deformation ratio D of the elemental wire 1 is represented as follows:

$$D=(L-R)/R\times 100\%\qquad\text{Formula (4)}$$

The diameter R may be obtained by measuring a cross-sectional area of the elemental wire 1, or alternatively, if a diameter of the elemental wire 1 before deformed such as as by pressing is known, or if a portion in which the elemental wires 1 are not deformed (corresponding to a low-flatness portion as will be described later) is also included in the same electric wire conductor 10, a diameter of the elemental wire 1 which is not deformed may be used as the diameter R. Further, only elemental wires 1 disposed on the outermost periphery of the electric wire conductor 10 may be employed as the elemental wires 1 in the peripheral part, and only elemental wires 1 disposed in the center of the electric wire conductor 10 may be employed as the elemental wires 1 in the center part. However, from the viewpoint of reducing influence of variation in deformation of the elemental wires 1, the deformation ratio D is preferably obtained as an average value of a plurality of elemental wires 1 included in a region having a certain area. For example, regions surrounded by a rectangle with edges in a length of approximately 10 to 30% of the width W of the electric wire conductor 10, or regions surrounded by a circle having a diameter of approximately 10 to 30% of the width W may be employed including the outermost periphery or the center of the electric wire conductor 10, and such regions may be defined as the peripheral part and the center part, respectively.

The cross section of the electric wire conductor 10 according to the present embodiment having a flat shape can be formed more efficiently if the elemental wires 1 located in the upper and lower direction (±y direction) of the peripheral part of the electric wire conductor 10 are deformed into flat shapes than in the case where the elemental wires 1 located in the center part are deformed. However, if the elemental wires 1 in the peripheral part are intensively deformed, loads are concentrated on these elemental wires 1, whereby physical properties of the elemental wires 1 in the peripheral part of the electric wire conductor 10 become significantly different from those of the inner region. Further, since the shape of the elemental wires 1 in the peripheral part, especially in the outermost periphery defines the outer shape of the entire electric wire conductor 10, drastic deformation of such elemental wires 1 possibly causes an unnecessary irregular structure to be formed on the outer surface of the electric wire conductor 10. Such an irregular structure includes burr that may possibly be formed during processing of the raw wire strand 10' into a flat shape. The burr tends to be formed especially on end parts of the electric wire conductor 10 in the width direction (±x direction). It is preferable that burrs are not formed on the peripheral part of the electric wire conductor 10. Few irregular structures such as burrs on the electric wire conductor 10 as described above may be an index showing excellent flexibility of the electric wire conductor 10.

Meanwhile, in the electric wire conductor 10, making the deformation ratio of the elemental wire 1 at the peripheral part smaller than the deformation ratio of the elemental wire 1 at the center part can prevent concentration of the loads for deformation to the elemental wires 1 in the peripheral part and the formation of the unnecessary irregular structure on the outer periphery of the electric wire conductor 10. As described above, since the vacancy ratio defined by the formula (1) is ensured in the electric wire conductor 10 according to the present embodiment, and the elemental wires 1 may be arranged in various relative locations because of presence of the vacancies between the elemental wires 1, the cross section of the electric wire conductor 10 can be formed into a desired flat shape depending on the relative arrangement of the elemental wires 1, without drastic deformation of the shapes of each elemental wires 1.

From the viewpoint of effectively preventing the concentration of the loads for deformation to the elemental wires 1 at the peripheral part of the electric wire conductor 10 and the formation of the unnecessary irregular structure on the surface of the electric wire conductor 10, a ratio of the deformation ratio of elemental wire 1 at the peripheral part to the deformation ratio of elemental wire 1 at the center part (i.e., peripheral deformation ratio; deformation ratio at the peripheral part/deformation ratio at the center part×100%) is preferably 70% or lower, more preferably 65% or lower, still more preferably 50% or lower, and still furthermore preferably 25% or lower. In addition, a value of the deformation ratio of the elemental wire 1 at the peripheral part is preferably 20% or lower, more preferably 10% or lower, and still more preferably 5% or lower. It is preferable that the deformation ratio of the elemental wire 1 at the peripheral part is as small as possible, and the lower limit of the deformation ratio is not particularly specified.

The deformation ratio of the elemental wire 1 in the center part is not specifically limited; however, from the viewpoint of preventing application of loads to the elemental wire 1 due to excessive deformation, the deformation ratio of the elemental wire 1 in the center part is preferably 50% or lower, and more preferably 30% or lower. On the other hand, from the viewpoint of effectively forming the cross section of the electric wire conductor 10 to have the flat shape while suppressing the deformation of the elemental wire 1 in the peripheral part, the deformation ratio at the center part is preferably 10% or higher, and more preferably 20% or higher.

When the cross section of the electric wire conductor 10 contains opposing edges 11 and 12 parallel to the width direction x, especially, when the cross section of the electric wire conductor 10 has a rectangular shape, it is preferable that the deformation ratios of the elemental wires 1 at end parts in the width direction of the cross section, that is, at both end parts of the parallel opposing edges 11 and 12 are kept particularly low. This is because, when the cross section of the electric wire conductor 10 is formed into such a shape, in order to form the parallel opposing edges 11 and 12 along the width direction x, and to form a corner structure of an approximately right angle, the deformation ratio at the end parts in the width direction tends to be high. Further, processes for formation of the electric wire conductor 10 such as compression of the raw wire strand 10' possibly causes sharp burrs in the end parts. From the viewpoint of preventing those phenomena, in the cross section of the electric wire conductor 10, the deformation ratios of the elemental wires 1 particularly at the end parts in the peripheral part are preferably 70% or lower, more preferably 50% or lower, and still more preferably 25% or lower of the deformation ratios of the elemental wires 1 at the center part. In addition, a value of the deformation ratios of the elemental wires 1 at the end parts is preferably 20% or lower, more preferably 10% or lower, and still more preferably 5% or lower. Further, when the deformation ratios of the elemental wires 1 are compared within the peripheral part between the end parts and the side parts, it is preferable that the deformation ratio at the end parts is lower than the deformation ratio at the side parts, where the side parts mean intermediate parts of the opposing edges 11 and 12 along the width x direction excepting the end parts. In other words, the deformation ratios are preferably in the following order, from the lowest: the end part, the side part, and the center part.

In the electric wire conductor 10, as the number of the elemental wire 1 is increased, it becomes easier to form the cross section into a flat shape while keeping the deformation ratios of the elemental wires 1 at the peripheral part lower than those at the center part and maintaining the high vacancy ratio such as the one defined by the formula (1). For example, when the number of the element wire 1 is 50 or more, the condition as above can be sufficiently achieved owing to variation in relative arrangements of the elemental wires 1. On the other hand, when the number of the elemental wire 1 is less than 50, it is still preferable to ensure the vacancy ratio defined by the formula (1) for the purpose of obtaining the sufficient flexibility of the electric wire conductor 10, even if the elemental wires 1 in the peripheral part are deformed at a deformation ratio equivalent to or higher than the elemental wires 1 in the center part.

(4) Material and Conductor Cross-Sectional Area of the Electric Wire Conductor

The elemental wires 1 constituting the electric wire conductor 10 may be made of any conductive material such as a metal material. Examples of typical material constituting the elemental wire 1 may contain copper, a copper alloy, aluminum, and an aluminum alloy. These metal materials are suitable for the electric wire conductor 10 according to the present embodiment in that processes of forming the wire strand and pressing into a flat shape are easy to be carried out, and the flat shape is easy to be maintained. As the elemental wires 1 constituting the electric wire conductor 10, the elemental wires all made of the same material may be used, or a multiple kinds of elemental wires made of different materials may be mixed.

The conductor cross-sectional area of the electric wire conductor 10 may be appropriately selected according to a desired electrical conductivity, for example. As described above, in the electric wire conductor 10, as the number of the elemental wire 1 is increased, it becomes easier to form the cross section into a flat shape while keeping the deformation ratios of the elemental wires 1 at the peripheral part lower than those at the center part and maintaining the high vacancy ratio such as the one defined by the formula (1). As the conductor cross-sectional area large, it becomes easier to increase the number of the elemental wires 1 contained in the electric wire conductor 10, and thus the cross section of the electric wire conductor 10 is easily formed into a flat shape while suppressing deformation of the elemental wires 1 in the peripheral part and maintaining vacancy ratio. From such a viewpoint, a preferable cross-sectional area of the conductor is 5 mm$^2$ or larger and more preferably 10 mm$^2$ or larger.

The larger the conductor cross-sectional area is, the easier it becomes to form the flat shape by processes such as pressing, and the flat shape once formed can be firmly maintained. From such a viewpoint, more preferable conductor cross-sectional area is, for example, 16 mm$^2$ or more when the elemental wires 1 constituting the electric wire conductor 10 are made of copper or a copper alloy, and 40 mm² or more when the elemental wires 1 are made of aluminum or an aluminum alloy.

Further, in a case where the conductor cross-sectional area is as large as 100 mm² or more, if the electric wire conductor has a substantially circular cross section, a diameter of the circular cross section becomes large so that a large space is required for routing, and an opposing force incurred upon bending becomes large, whereby it becomes difficult to ensure the flexibility sufficient for routing. In contrast, the electric wire conductor 10 having the flat cross section enables the height H to be kept smaller than in the case of the electric wire conductor having the substantially circular cross section with the same conductor cross-sectional area. Thus, a space in the height direction y occupied by the electric wire conductor 10 is reduced, the opposing force generated upon bending along the height direction y becomes smaller, whereby the flexibility required for routing is efficiently achieved. Also, by forming the cross-sectional shape of the electric wire conductor 10 with a large conductor cross-sectional area into flat, a heat dissipation performance of the electric wire conductor 10 is enhanced. From the viewpoint of effectively utilizing these advantages such as ensuring the flexibility, the conductor cross-sectional area is preferably 100 mm² or larger when the electric wire conductor 10 is made of copper or a copper alloy. The conductor cross-sectional area is preferably 130 mm² or larger when the electric wire conductor 10 is made of aluminum or an aluminum alloy. The electric wire conductor 10 having such a large conductor cross-sectional area is anticipated for application to a power supply wire for an electric vehicle of high output, for example. Since the power supply wires are required to be routed in a limited space in the vehicle, the space-saving property and flexibility of the electric wire conductor 10 having a flat cross section are advantageous. In particular, from the viewpoint of reducing vehicle weight, it is effective to form the electric wire conductor 10 having a large conductor cross-sectional area from aluminum or an aluminum alloy; however, since aluminum and an aluminum alloy have a lower electrical conductivity than copper and a copper alloy, the electric wire conductor 10 having a particularly large conductor cross-sectional area such as 130 mm² or more is needed for obtaining the required electrical conductivity.

Furthermore, preferable outer diameter of each elemental wire 1 contained in the electric wire conductor 10 is 0.3 to 1.0 mm, for example. The number of elemental wires 1 contained in the electric wire conductor 10 is determined depending on the conductor cross-sectional area of the electric wire conductor 10 and the outer diameter of the elemental wires 1 to be used. Meanwhile, as the number of elemental wires 1 is increased, the elemental wires 1 may be disposed in more various relative positions, which makes it easier to form the electric wire conductor 10 to have the flat cross section while ensuring the high vacancy ratio as the one defined by the formula (1), and further keeping the deformation ratio of the elemental wires 1 at the peripheral part of the electric wire conductor 10 low. From this viewpoint, the number of elemental wires 1 is preferably 50 or more, more preferably 100 or more, and still more preferably 500 or more.

(5) Aspect Ratio of the Electric Wire Conductor

For the cross section of the electric wire conductor 10, an aspect ratio (H:W) of the flat shape may be appropriately selected in consideration of a desired space-saving property, for example. The range of 1:2 to 1:8 may be provided as an example of the aspect ratio. Within this range, the wire strand can be effectively formed into the flat shape while obtaining the high space-saving property. Further, in a case where the electric wire conductor 10 is used for wiring in an automobile, for example, a configuration in which a height H is 3 mm or smaller may be provided as a preferable example.

As will be described later, when a raw wire strand 10' formed of a conventional wire strand having a substantially circular cross section is subjected to pressing to form the electric wire conductor 10 having a flat cross section, vacancies between the elemental wires 1 tend to be smaller as the rolling process proceeds. Especially, the higher the aspect ratio of the flat cross section of the electric wire conductor 10 is (the width W is larger in comparison with the height H), the lower the vacancy ratio tends to be. However, when the vacancy ratio defined by the formula (1) as described above is ensured in the case where the aspect ratio (H:W) is 1:3 or higher, that is, the width W of the electric wire conductor 10 is three times or more larger than the height H, for example, the electric wire conductor 10 can effectively achieve both the high space-saving property and the flexibility.

Further, by forming the electric wire conductor 10 to have a flat cross section, a surface area becomes large compared with the substantially circular cross section, which enhances the heat dissipation performance of the electric wire conductor 10. As a result, when a same amount of electrical current is applied, a temperature rise of the electric wire conductor 10 having a flat cross section is smaller than in the case where the conductor has a circular cross section. In other words, when an upper limit of temperature rise is determined, a same amount of electrical current can be applied to the electric wire conductor 10 having a flat cross section with a conductor cross-sectional area smaller than that having a substantially circular cross section, while suppressing the temperature rise within a range below the upper limit. As the aspect ratio of the electric wire conductor 10 is increased, an effect of improving the heat dissipation performance is enhanced. For example, as will be described in Examples below, when the aspect ratio is 1:3 or higher, even if the conductor cross-sectional area of the electric wire conductor 10 having a flat cross section is 90% of that of the electric wire conductor 10 having an approximately circular cross section, the temperature rise can be suppressed to the same degree. Further, the aspect ratio is preferably 1:5 or higher.

(6) Other Embodiments

Hereinbefore, the embodiment has been described in which the entire region of the electric wire conductor 10 in the axial direction consists of the flat portion having a flat cross section. However, the flat portion may constitute apart of the entire region in the axial direction of the electric wire conductor 10. That is to say, the flat portion and a low-flatness portion having a flatness (i.e., a ratio of W to H) lower than the flat portion may be arranged adjacent to each other along the axial direction of the electric wire conductor 10, for example. The flat portion and the low-flatness portion consist of common elemental wires 1 integrally continuous therethrough, and have different cross-sectional shapes. The low-flatness portion has a cross section approximately circular having a flatness of substantially one. By disposing the flat portion and the low-flatness portion continuously in one electric wire conductor 10, the electric wire conductor 10 can obtain both properties provided by the flat portion and the low-flatness portion without process such as joining.

At the low-flatness portion, since the flatness of the electric wire conductor 10 obtained through process such as pressing is small, it is preferable that the deformation ratio of the elemental wire 1 is smaller than that in the flat portion, accordingly. In particular, in the low-flatness portion having a substantially circular cross section with the flatness of substantially one, it is preferable that the elemental wires 1 also have substantially circular cross sections.

The flat portion and the low-flatness portion may be disposed along the axial direction of the electric wire conductor 10 in any order. However, a configuration in which the flat portion is disposed in the center part of the axial direction and the low-flatness portions having a substantially circular cross section are disposed on both ends thereof can be presented as a preferred example. In this case, the flat portion can be used for routing in a limited space, and simultaneously other members such as terminals are attached to both ends of the low-flatness portions. Thus, it is possible to utilize both the space-saving property and the flexibility of the flat portion, as well as convenience of attaching the other members to the low-flatness portions having a circular or substantially circular cross section. Further, in the flat portion, a plurality of portions with different flatness may be disposed adjacent to each other.

[Production Method of Electric Wire Conductor]

Figure 3:
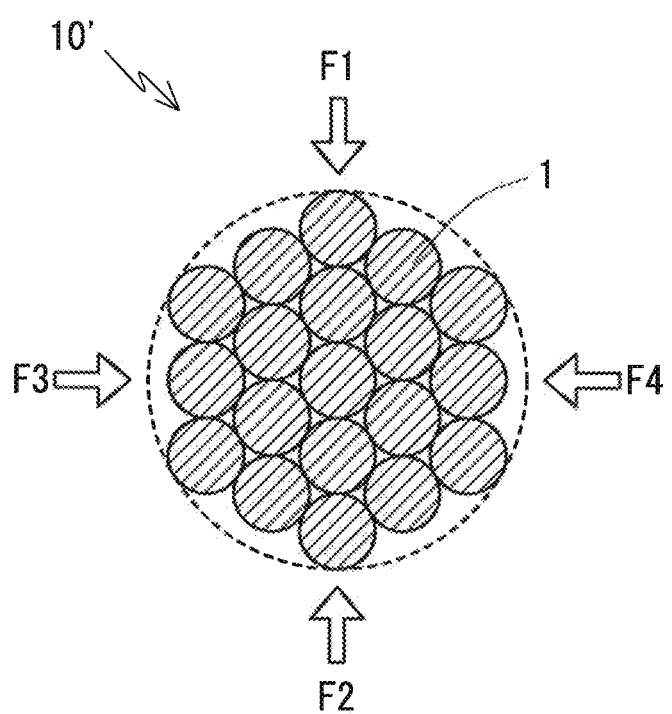
FIG. 3 is a cross-sectional view which illustrates rolling of a raw wire strand.

As shown in FIG. 3, the electric wire conductor 10 according to the present embodiment can be formed by pressing a raw wire strand 10' which contains a plurality of elemental wires 1 twisted together and has a substantially circular cross section. For pressing, forces F1 and F2 are applied from a first direction and a second direction opposing one another that are perpendicular to the axial direction of the raw wire strand 10' to compress the raw wire strand 10', so as to obtain a flat electric wire conductor 10 in which an applying direction of the forces F1 and F2 corresponds to the height direction y.

Further, in addition to the forces F1 and F2 applied from the first direction and the second direction, forces F3 and F4 are applied to the raw wire strand 10' from a third direction and a forth direction opposing one another and intersecting the first and second directions, so as to effectively form electric wire conductor 10 to have a quadrangular cross section. Especially, by applying the forces F3 and F4 from directions perpendicular to the forces F1 and F2, the electric wire conductor 10 is effectively formed to have a rectangular cross section. In this case, by making the forces F1 and F2 larger than the forces F3 and F4, the electric wire conductor 10 with a high flatness (i.e., the ratio of W to H is large) can be obtained. Further, the forces F1 and F2, and the forces F3 and F4 may be applied simultaneously; however, by applying the forces F1 and F2 first, and then applying the forces F1' and F2' from the same directions as the forces F1 and F2 simultaneously with the forces F3 and F4, the electric wire conductor 10 with the high flatness can be obtained, in which the cross section is firmly formed into a quadrangular shape (especially, a rectangular shape). In the case of changing the flatness along the axial direction of the electric wire conductor 10, the applied forces may be changed during the pressing along the axial direction.

The forces may be applied to the raw wire strand 10', for example, by passing the raw wire strand 10' between the rollers disposed opposing to each other. The raw wire strand 10' is pressed with the rollers while extruded along a rolling direction of the rollers, whereby it is possible to sufficiently deform the outer shape of the entire raw wire strand 10' into a flat shape without applying a heavy load to the raw wire strand 10', compared with drawing where a die is used to compress the raw wire strand 10' or pressing where a press machine is used to compress the raw wire strand 10'. Further, it is easier to apply a load evenly over the entire raw wire strand 10' without concentrating a high load to a peripheral part of the raw wire strand 10' in contact with the rollers. As a result, by using the rollers for the pressing of the raw wire strand 10', vacancies between the elemental wires 1 can be sufficiently ensured in the flat cross section of the electric wire conductor 10 thus obtained, compared with a case where a die or a pressing machine is used. Further, the deformation ratio of each of the elemental wires 1 including the elemental wire 1 located in the peripheral part of the electric wire conductor 10 can be kept low. The vacancy ratio and the deformation ratio of each of the elemental wires 1 may be adjusted by changing the magnitude of applying forces for the pressing (F1, F2, F3, F4, F1', and F2') and a shape of a part of the roller contacting the raw wire strand 10'.

By using the rollers, the raw wire strand 10' as a whole can be formed into a flat shape while the deformation ratios of the elemental wires 1 are suppressed, whereby change in physical properties of the produced electrical wire conductor 10 due to the deformation of the elemental wires 1 can be suppressed. Thus, in many cases, a process such as heat treatment for eliminating influence of processing distortion or work hardening is not particularly required for the electric wire conductor 10 after the rolling.

In the electric wire conductor 10 formed by pressing of the raw wire strand 10', a compression ratio of the wire strand 10' may be focused as an index for obtaining a desired vacancy ratio. The compression ratio is defined by [1−(vacancy ratio of the obtained electric wire conductor)/(vacancy ratio of the wire strand)]×100%, and which may be regarded as a reduction rate of the conductor cross-sectional area. As the compression ratio is lowered, the electric wire conductor 10 obtains a higher vacancy ratio. For example, if the compression ratio is suppressed to 70% or lower, and further to 65% or lower, a vacancy ratio satisfying the above formula (1) may be obtained easily.

[Covered Electric Wire]

Figure 5A:
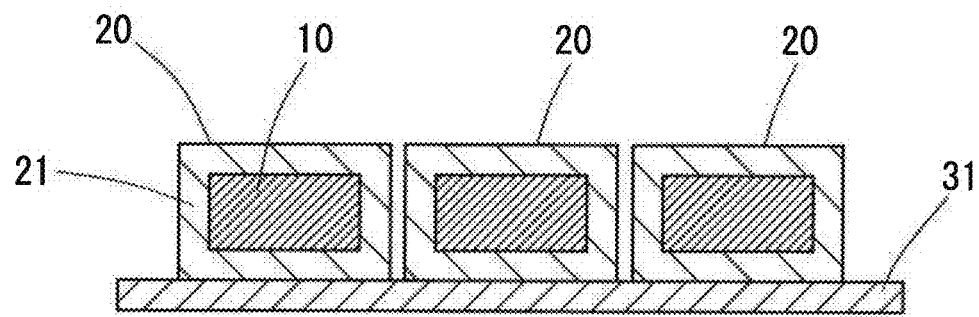
FIGS. 5A and 5B are cross-sectional views that illustrate examples of arrangement of covered electric wires in a wiring harness according to one embodiment of the present invention.
Figure 5B:
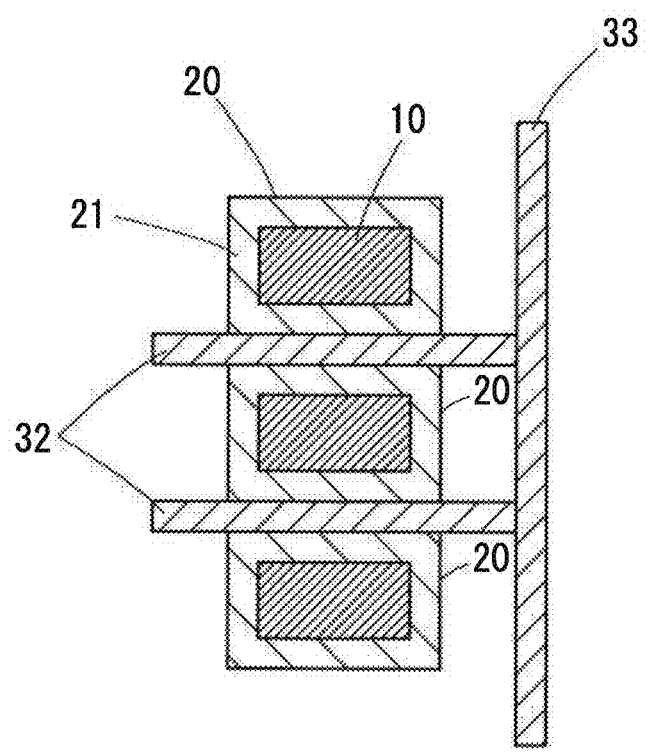

As described above, a covered electric wire 20 according to one embodiment of the present invention contains the electric wire conductor 10 according to the embodiment of the present invention as described above, and the insulator 21 which covers the outer periphery of the electric wire conductor 10 (see FIGS. 5A and 5B, etc.).

An outer shape of the entire covered electric wire 20 including the insulator 21 reflects the outer shape of the electric wire conductor 10. As the electric wire conductor 10 has a flat shape, the covered electric wire 20 also has a flat shape. Further, as the electric wire conductor 10 has high flexibility in each direction, the covered electric wire 20 also has high flexibility in each direction.

A material of the insulator 21 is not specifically limited, and a variety of polymer materials may be used to form the insulator 21. Further, the polymer material may contain fillers or additives as appropriate. However, it is preferable to select the material for the insulator 21 and a thickness thereof such that the flexibility of the insulator 21 is higher than the flexibility of the electric wire conductor 10, so as not to deteriorate the excellent flexibility of the electric wire conductor 10. In addition, it is preferable to select the thickness of the insulator 21 such that the flat shape of the electric wire conductor 10 is sufficiently reflected to the shape of the entire covered electric wire 20 so that the entire covered electric wire 20 has a flat cross section.

The insulator 21 may cover a whole periphery of the electric wire conductor 10. In this case, the insulator 21 can be provided by extruding the polymer material for the insulator 21 on the whole periphery of the electric wire conductor 10. Alternatively, insulation films as the sheet-shaped insulators 21 may sandwich the electric wire conductor 10 from the top and the bottom in the height direction (±y direction) of the electric wire conductor 10. In this case, two sheets of insulation films made of polymer material are disposed at the top and bottom of the electric wire conductor 10 and may be adjoined each other by fusing or adhesion, for example, as appropriate.

In the case where the electric wire conductor 10 is insulated using the insulation films, laminating such as thermal lamination and dry lamination may be utilized. For example, the insulation films made of a polyester resin are placed on both of the top and bottom sides of the conductor 10, and the spaces between the top and bottom insulation films and the spaces between the insulation films and the electric wire conductor 10 are joined with an adhesive.

Especially, where the insulator 21 is formed by extrusion, the electric wire conductor 10 having a flat cross section also promotes improvement of wear resistance of the insulator 21. Where an insulator is formed on the outer periphery of an electric wire conductor having a substantially circular cross section, an irregular structure is likely to be formed on the outer periphery of the electric wire conductor due to the shape of elemental wires constituting the electric wire conductor, and thus the insulator formed on each part of the outer periphery of the electric wire conductor is not likely to be uniform in thickness. Accordingly, even if the insulator has a portion at which the thickness is smaller than other portions, a necessity arises to increase the thickness of the insulator as a whole for obtaining a thickness satisfying predetermined wear resistance. Meanwhile, on the outer surface of the electric wire conductor 10 having a flat shape, a flat surface is formed in the upper and lower direction (±y direction), and thus the insulator 21 covering the outer periphery of the electric wire conductor 10 can be effectively formed to have a uniform thickness at each portion. Accordingly, even though the thickness of the insulator 21 is made small as a whole, the insulator 21 can easily keep the smallest thickness, required from the viewpoint of obtaining wear resistance, etc., at each portion of the outer periphery of the electric wire conductor 10. Thus, the covered electric wire 20 having the insulator 21 that is excellent in wear resistance is formed without increase of cost resulting from formation of a thick insulator 21 as a whole or increase of space to be required for routing the covered electric wire 20.

Further, for a covered electric wire containing an electric wire conductor having a substantially circular cross section, the outer surface of an insulator contacts an external object with a small area, and a load tends to collectively applied to the small area. Meanwhile, for the covered electric wire 20 containing the electric wire conductor 10 having a flat shape, the insulator 21 is formed along the flat surface of the electric wire conductor 10, and thus exposure of the insulator 21 tends to occur at its flat surface, and even where the insulator 21 contacts an external object, the contact tends to occur in the flat surface and in a large area. Consequently, the load applied due to the contact may be dispersed into a large area, and thus although the insulator 21 is formed to have a small thickness, it can effectively exhibit high wear resistance enough to resist wear due to application of load.

Thus, by forming the covered electric wire 20 to contain the electric wire conductor 10 having a flat shape, even where the insulator 21 is formed to have a small thickness, the covered electric wire 20 can be formed to have the insulator 21 that is excellent in wear resistance due to the effects of uniform thickness of the insulator 21 and the effects of the insulator 21 capable of receiving contact with an external object in a large area. The effects are further promoted by preventing burrs from formed on the outer periphery of the electric wire conductor 10.

The covered electric wire 20 may be used in a form of a single wire in which the outer periphery of one electric wire conductor 10 is covered with the insulator 21, or may be used in a form of a wiring harness in which a plurality of covered electric wires are assembled and integrally bundled with a covering material, for example, as necessary. Hereinafter, examples of the wiring harness containing the covered electric wires 20 will be described.

[Wiring Harness]

A wiring harness according to one embodiment of the present invention contains a plurality of covered electric wires being assembled, in which at least a part of the plurality of covered electric wires are the covered electric wires 20 according to the embodiment of the present invention containing the above-mentioned flat electric wire conductors 10. The wiring harness may contain only the covered electric wires 20 containing the above-mentioned flat electric wire conductors 10, or may contain such covered electric wires 20 together with different kinds of covered electric wires such as a covered electric wire containing a conventional electric wire conductor having a substantially circular cross section. Further, in a case where the wiring harness contains a plurality of covered electric wires 20 containing the flat electric wire conductors 10, features such as a material, shape, and size of the electric wire conductor 10 and the insulator 21 constituting the plurality of the covered electric wires 20 may be of the same or may be different from each other. The plurality of covered electric wire contained in the wiring harness may be integrally bundled with an insulation material, for example, as necessary.

(1) Arrangement of the Covered Electric Wires in Wiring Harness

In the case of constructing a wiring harness with the plurality of covered electric wires 20 containing the flat electric wire conductors 10, the plurality of covered electric wires 20 may be disposed in any positional relationship. For example, the covered electric wires 20 may be aligned side by side in the width direction x (the lateral direction) of the flat electric wire conductor 10 as shown in FIG. 5A, or may be stacked in the height direction y as shown in FIG. 5B, or may be in a matrix shape in which the plurality of covered electric wires 20 disposed side by side in the width direction x are stacked in multiple layers in the height direction y as shown in FIGS. 6A to 6C, and 8B. That is to say, the plurality of covered electric wires 20 may be aligned along at least either the width direction x or the height direction y. In this way, the neat arrangement of the plurality of covered electric wire 20 containing the flat electric wire conductors 10 makes it possible to reduce spaces between the covered electric wires 20 forming the wiring harness, thus providing the wiring harness with a remarkably excellent space-saving property.

In particular, in the case of disposing the plurality of covered electric wires 20 side by side in the width direction x of the flat electric wire conductor 10, the space-saving property along the height direction y resulting from the flat shape of the electric wire conductors 10 may be effectively used in formation and routing of the wiring harness. The space-saving property can be effectively used, for example, when the wiring harness is routed in a space of a limited height, or when other member is disposed above or below the wiring harness. Further, the heat dissipation performance of each of the covered electric wires 20 can be effectively achieved.

In the case of disposing the plurality of covered electric wires 20 side by side in the width direction, it is preferable that the heights H of the electric wire conductors 10 and the heights H' of the covered electric wires 20 are respective uniform even where the plurality of covered electric wires 20 (20B) aligned along the width direction x of the wiring harness have different conductor cross-sectional areas. With the respective uniformity, the top and bottom surfaces of the wiring harness in the height direction are formed as flat surfaces. Here, the concept that the heights H of the electric wire conductors 10 and the heights H' of the covered electric wires are respective uniform means a state where height differences between the electric wire conductors 10 are 10% or lower and height differences between the covered electric wires 20 are 10% or lower from the respective average heights.

Further, in the case of disposing the plurality of covered electric wires 20 side by side at least in the width direction to constitute the wiring harness, it is preferable that the insulator 21 covering the electric wire conductors 10 aligned along the width direction is formed by the above described laminating using insulation films. In this case, the electric wire conductors 10 are aligned along the width direction x and laminating is performed with the electric wire conductors 10 collectively sandwiched by two sheets of the insulation films from the top and bottom directions, whereby the two sheets of the insulation films are adjoined each other by fusing or adhesion in the outer peripheral parts of the electric wire conductors 10 and positions between the electric wire conductors 10. Thus, the electric wire conductors 10 aligned along the width direction x are insulated from the outside using the insulation films, and a wiring harness that is insulated by the insulation films and/or adhesion may be formed.

By performing laminating, the insulator covering is easily applied to the electric wire conductors 10 aligned along the width direction x. Further, comparing with the case where the insulator covering is individually applied to each electric wire conductor 10 by extrusion, the total thickness of the insulator 21 can be made small and a phenomenon of forming vacancy between an adjacent part and the individual insulator 21 can be eliminated. Consequently, the wiring harness that is especially excellent in space-saving property may be formed.

As described above, in the wiring harness, the plurality of the covered electric wires 20 are aligned side by side in the width direction x and further stacked in multiple layers in the height direction y to have a matrix shape. In this case, the covered electric wires 20 disposed in the width direction x may be treated as a unit and the same units are formed in multiple to be stacked in the height direction y, or the covered electric wires 20 disposed in the width direction x may be treated as a unit and different types of units are formed in multiple to be stacked in the height direction y. The specific examples of the latter case are shown in FIGS. 6A to 6C.

Figure 6A:
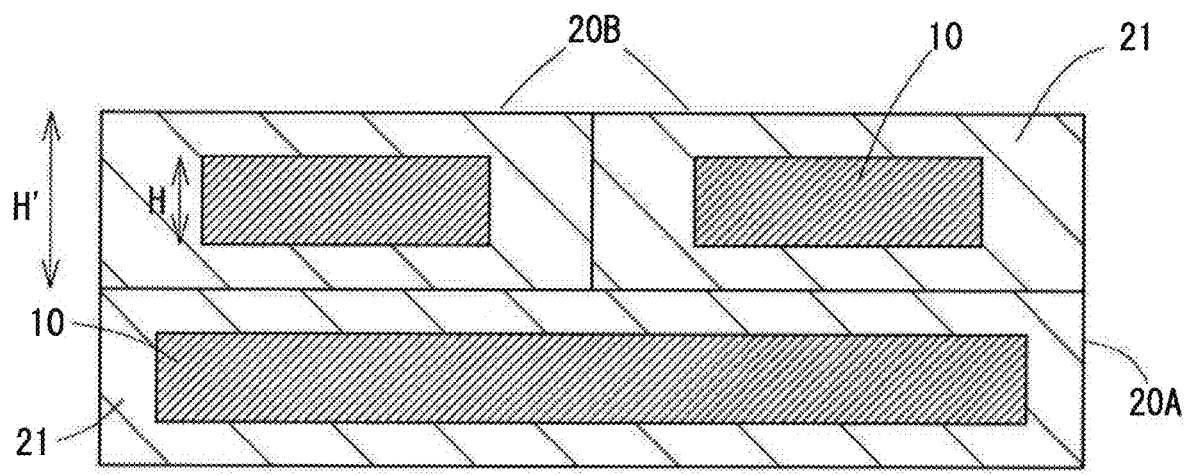
FIGS. 6A to 6C are cross-sectional views illustrating other examples of arrangement of the covered electric wires.
Figure 6B:
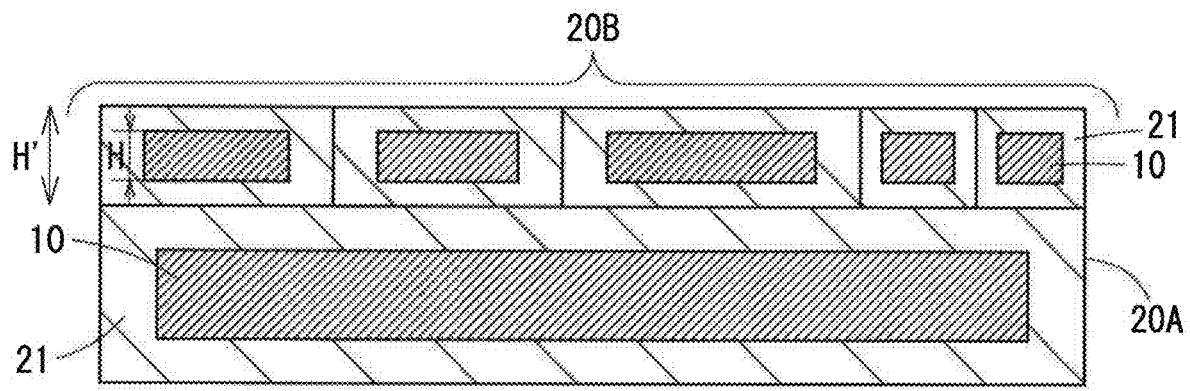
Figure 6C:
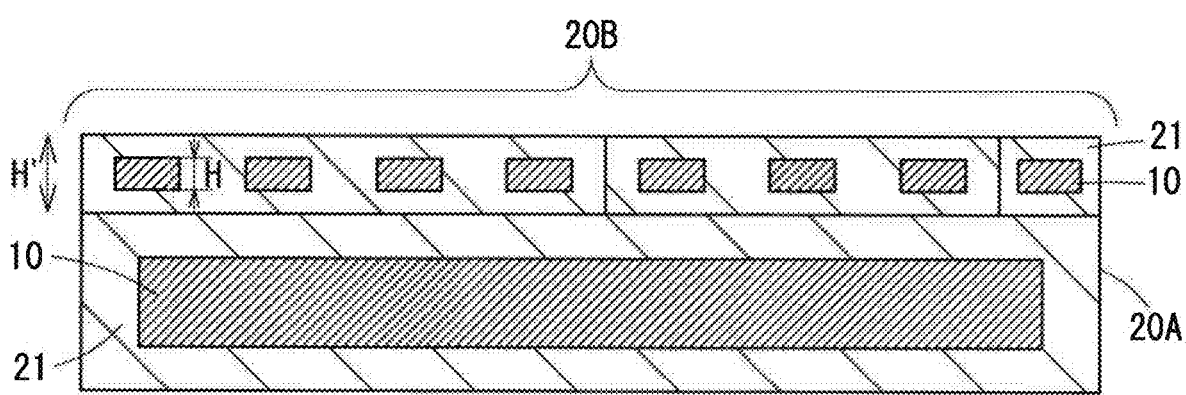

In each of FIGS. 6A to 6C, a large cross-section covered electric wire 20A having a large conductor cross-sectional area and the laterally-long electric wire conductor 10 is disposed on a lower position in the height direction y, and a plurality of small cross-section covered electric wires 20B each having a smaller conductor cross-sectional area than the large cross-section covered electric wire 20 and the laterally-short electric wire conductor 10 are disposed on the upper position in the height direction y. The plurality of small cross-section covered electric wires 20B are aligned side by side in the width direction x such that the lower surfaces of the aligned wires 20B are in contact with the upper surface of the large cross-section covered electric wire 20A. The large cross-section covered electric wire 20A and the small cross-section covered electric wires 20B are stacked in multiple layers in the height direction to constitute the wiring harness, whereby the small cross-section covered electric wires 20 are disposed by utilizing a space over the large cross-section covered electric wire 20B effectively, achieving an excellent space-saving property. Further, the small cross-section covered electric wires 20B are stably disposed due to the large upper surface of the large cross-section covered electric wire 20B.

Herein, the plurality of small cross-section covered electric wires 20B may have the same conductor cross-sectional area as shown in FIGS. 6A and 6C or have different conductor cross-sectional areas as shown in FIG. 6B. In either case, the space-saving property may be effectively improved by uniformity of the height H of the electric wire conductors 10 and the height H' of the covered electric wires 20B in the small cross-section covered electric wires 20B aligned along the width direction x. Further, it is preferable that the lateral width of the small cross-section covered electric wires 20B aligned along the width direction is the same as or smaller than the lateral width of the large cross-section covered electric wire 20A, and the small cross-section covered electric wires 20B do not extend beyond the large cross-section covered electric wire 20A in the width direction.

Further, the insulator covering may be applied individually to the electric wire conductor 10 contained in each small cross-section covered electric wire 20B by such as extrusion, or it may be applied collectively to the plurality of the electric wire conductors 10 by performing such as laminating. However, from the viewpoint of enhancing the space saving of the wiring harness, and especially ensuring the flatness of the contact surface with the large cross-section covered electric wire 20A, it is preferable that the insulator covering is collectively performed. In the configuration shown in FIG. 6C, the insulator covering is collectively applied by laminating to the four electric wire conductors 10 disposed on the left side, and the three electric wire conductors 10 disposed on the right side for each group.

On the other hand, in the case where the plurality of covered electric wires 20 are arranged in the height direction y of the flat electric wire conductor 10, that is, stacked in multiple layers along the height direction y, the wiring harness can be constructed and routed while keeping a size in the width direction x of the entire wiring harness small even when a size in the width direction x (the width W) of the electric wire conductor 10 is large due to its flat shape. As a result, a space such as a long and thin space in the height direction can be utilized for routing.

In the wiring harness, disposing a heat dissipation sheet in contact with each of the aligned covered electric wires 20 makes it possible to ensure the heat dissipation performance of each of the covered electric wires 20, even when a great number of the covered electric wires 20 are aligned closely to one another by utilizing the flat shape. Here, the heat dissipation sheet is a sheet-shaped (including plate-shaped) member consisting of a heat dissipation material having a heat dissipation performance higher than the covered electric wire 20. Examples of the heat dissipation sheet may include a sheet or a plate made of aluminum or an aluminum alloy. For example, the heat dissipation sheet may be disposed between the plurality of covered electric wires 20 constituting the wiring harness, or disposed commonly contacting the plurality of covered electric wires 20.

As shown in FIG. 5A, in the case of aligning the plurality of covered electric wires 20 side by side in the width direction x, a heat dissipation sheet 31 is preferably disposed so as to commonly contact the surfaces of the covered electric wires 20 along the width direction x (a flat surface). When the flat surface having a large area resulting from the flat shape of the electric wire conductor 10 is in contact with a surface on one side of the heat dissipation sheet, the heat dissipation performance of the covered electric wire 20 can be effectively enhanced. Further, by commonly arranging the heat dissipation sheet 31 for the plurality of covered electric wires 20, the configuration of the wiring harness containing the heat dissipation sheet 31 can be simple. In the configuration illustrated in the figure, the covered electric wires 20 are not in contact with each other in the width direction x; however, when they contact with each other, it is preferable that the heat dissipation sheets are also interposed between the covered electric wires 20 adjacent to each other.

As shown in FIG. 5B, in the case of aligning the plurality of covered electric wires 20 in the height direction y, it is preferable to dispose a heat dissipation sheet as an interposing sheet 32 to be disposed between each of the covered electric wires 20. The interposing sheets 32 are in contact with flat surfaces of the respective covered electric wires 20 along the width direction x. The flat surface has a large area because of the flat shape of the electric wire conductor 10, and thus it tends to be difficult to outwardly dissipate heat generated by application of an electric current in the alignment where the plurality of the covered electric wire 20 are disposed with the flat surfaces with large area close to or in contact with each other; however, the interposing sheet 32 between the covered electric wires 20 promotes heat dissipation.

Further, the plurality of interposing sheets 32 disposed between the respective covered electric wires 20 are preferably connected with one another by a connection member 33 made of a heat dissipation material. The connection member 33 enhances the heat dissipation performance of each of the covered electric wires 20, compared with the case where only the interposing sheets 32 are disposed. The connection member 33 may be disposed as a member specialized in heat dissipation of the covered electric wires 20 via the interposing sheets 32, or a member which is disposed for another purpose. For example, a columnar member constituting an automobile body may be used as the connection member 33 so that the member may serve as a structure material for the automobile body, as the connection member 33 which helps the heat dissipation of the covered electric wires 20 via the interposing sheets 32, and further as a support member for supporting the wiring harness containing the plurality of covered electric wires 20.

As will be described in the Examples below, when the heat dissipation sheet 31 made of aluminum or an aluminum alloy is disposed in contact with the flat surface of the covered electric wire 20 along the width direction x as shown in FIG. 5A, a cross-sectional area at a cross section of the heat dissipation sheet 31 perpendicularly intersecting the axial direction of the covered electric wire 20 is, for every covered electric wire, preferably 1.5 times or larger, and more preferably 4 times or larger of the cross-sectional area of the electric wire conductor 10 constituting the covered electric wire 20. Then, the heat dissipation performance of the covered electric wire 20 can be effectively enhanced.

(2) Routing in an Automobile

As described above, when the wiring harness including the covered electric wires 20 having the flat electric wire conductor 10 is used, for example, as a wiring material for an automobile, it is possible to effectively utilize the excellent space-saving property. Routing such a wiring harness along a member such as floor and a frame of a vehicle makes it possible to effectively utilize a limited space under the floor or around the frame for routing. Meanwhile, when the wiring harness is disposed such that the width direction x of the electric wire conductor 10 is approximately parallel to the surface of a floor or a frame member, more excellent space-saving property can be achieved.

A conventional wiring harness contains covered electric wires having a substantially circular cross section bundled together, thus the entire wiring harness tends to be bulky. In order to produce a space for routing in an automobile, a residential space (a space where a passenger can stay) is often reduced. However, as described above, when the wiring harness containing the covered electric wires 20 containing the flat electric wire conductor 10 is used to keep the space necessary for routing the wiring harness small, a large residential space can be provided.

The wiring harness according to the present embodiment may be used in an automobile as a wiring material for any purpose; and for example, it may be used as a power-supply trunk line to be disposed under a floor. A conventional power-supply trunk line for an automobile has been made of a material which contains an insulation sheet and copper plates disposed side by side; however, continuously forming a large copper plate is difficult and results in a low productivity. In addition, since the material contains a continuous metal body, fatigue fracture of the material possibly occurs due to influence of engine vibration of the automobile, for example. In contrast, when the wiring harness according to the present embodiment constitutes a power-supply trunk wire, each of the process of forming the elemental wire 1 constituting the electric wire conductor 10, twisting the elemental wires 1, and forming the raw wire strand 10' obtained through twisting of the elemental wires 1 into a flat shape can be continuously performed for every portion of a continuous material, thus achieving a high productivity. Further, as the electric wire conductor 10 contains thin elemental wires 1, the entire electric wire conductor 10 has a high durability against bending and vibration. Therefore, the fatigue fracture due to the engine vibration, for example, hardly occurs.

The wiring harness may not only be routed under the floor of the automobile, but also form a floor or a ceiling itself with the wiring harness according to the present embodiment, for example. In an automobile, the wiring harness needs to be routed so as not to interfere with components such as an engine; however, such a wiring route is limited. In particular, in an automobile requiring a large current such as a hybrid vehicle and an electric vehicle, an electric wire with a large conductor cross-sectional area is required to be routed, but a wiring route capable of arranging the wiring harness including such an electric wire with a large conductor cross-sectional area is limited. However, by constituting the floor or the ceiling with the wiring harness according to the present embodiment, the space can effectively provide the wiring route, and also a large residential space can be ensured, which leads to both the space-saving property and the requirement for application of a large electric current.

Further, in a covered electric wire for a large electric current, an insulator easily deteriorates due to a heat generated by an electric wire conductor; however, arranging the wiring harness as the floor and the ceiling can effectively enhance heat dissipation performance. As a result, although an insulator 21 of low price with a comparatively low heat dissipation performance is used to configure the covered electric wire 20, deterioration of the insulator 21 hardly occurs. Furthermore, as the covered electric wire 20 containing the flat electric wire conductor 10 has the flat surface, the covered electric wires 20 may be disposed in various arrangements within a wiring harness, so that a combination of the flat surfaces enables the floor and the ceiling to have any surface shapes. When the wiring harness according to the present embodiment constitutes the floor or the ceiling, a covering material may be appropriately arranged on the outer side of the wiring harness so as not to directly expose the wiring harness to a ceiling surface and a floor surface.

Figure 7:
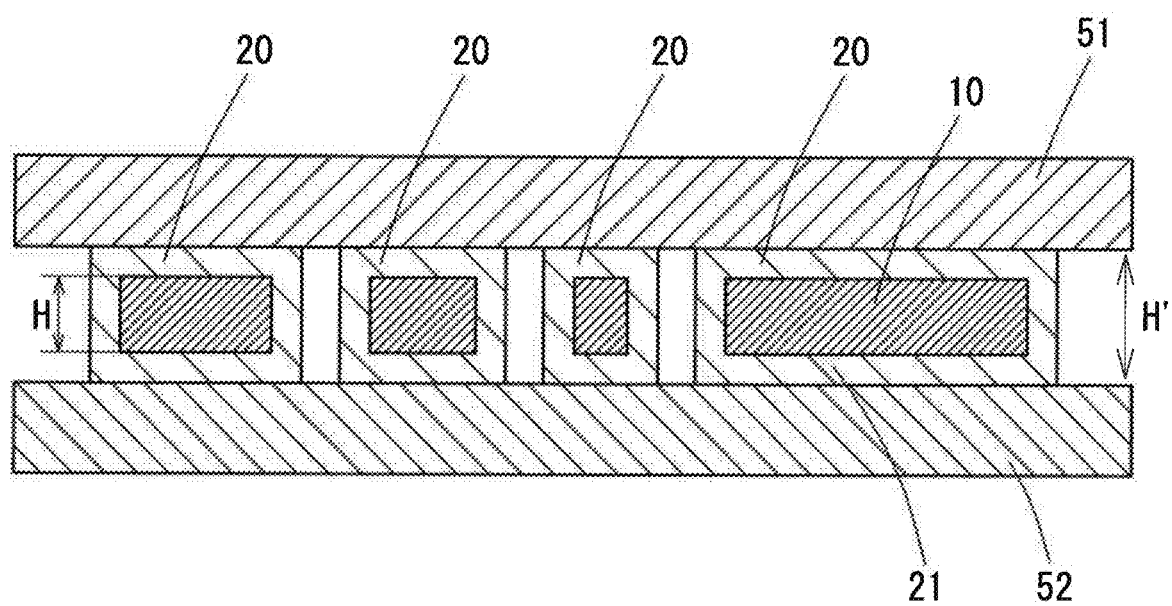
FIG. 7 is a cross-sectional view showing another embodiment where the covered electric wires are aligned in the width direction.

Moreover, when the wiring harness according to the present embodiment is disposed on the ceiling and the floor of the automobile, it is preferable that the electric wire conductors 10 have a uniform height H, and the covered electric wires 20 have a uniform height H', as shown in FIG. 7, even where the plurality of covered electric wires 20 forming the wiring harness have different conductor cross-sectional areas. Accordingly, upper and lower surfaces in the height direction of the wiring harness may be configured flat, whereby a high space-saving property is achieved in the height direction when the wiring harness is routed along the ceiling surface and the floor surface. Also, an irregular structure in the height direction of the wiring harness hardly affects interior design of the automobile or functions of adjacent members.

As shown in FIG. 7, it is preferable that the wiring harness in which the height H of the electric wire conductors and the height H' of the covered electric wires 20 are respective uniform as described above is disposed, for example, between an interior member 51 forming the floor or the ceiling of the automobile and a sound absorbing member 52 disposed adjacent to an outer side of the interior member 51 (on an opposite side of the residential space) such that the flat surfaces of the wiring harness along the width direction x are disposed along surfaces of the interior member 51 and the sound absorbing member 52. Then, a small space between the interior member 51 and the sound absorbing member 52 can be effectively utilized for routing the wiring harness. As the height H' of the covered electric wires 20 is uniform, the wiring harness can be arranged without unnecessarily increasing a distance between the interior member 51 and the sound absorbing member 52. Further, a possible problem may be prevented where an irregular structure in the height direction of the wiring harness appears as an irregular structure on the surface of the interior member 51 to deteriorate a surface design of the interior member 51. Furthermore, another possible problem may be prevented where the covered electric wires 20 with a large and non-uniform height H' press the surface of the sound absorbing member 52 to affect a performance of the sound absorbing member 52, including nonuniformity in a sound absorbing property. Here, examples of a combination of the interior member 51 and the sound absorbing member 52 may include a combination of a floor carpet and a silencer.

Figure 8A:
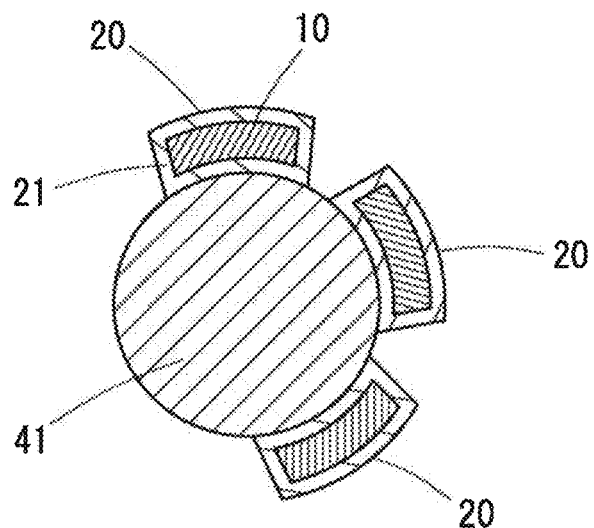
FIGS. 8A and 8B are views illustrating examples of routing structure of the wiring harness.
Figure 8B:
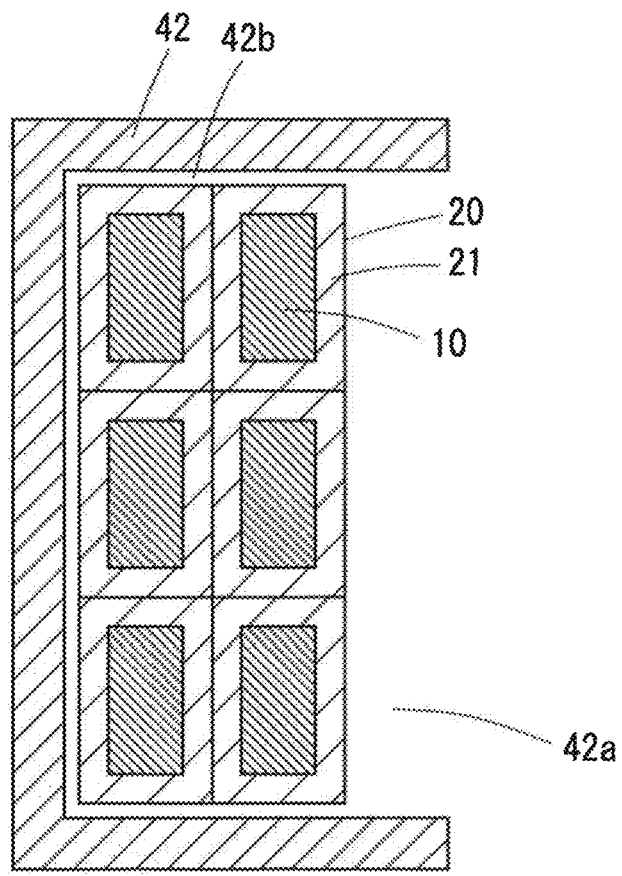

Moreover, the wiring harness according to the present embodiment may be routed in the automobile while using a variety of members constituting the automobile body as a supporting member. For example, as shown in FIG. 8A, the wiring harness may be disposed along an outer periphery of a columnar member constituting the automobile body. The wiring harness may be disposed so that a surface along the width direction x of each of the covered electric wires 20 forming the wiring harness is arranged along an outer peripheral surface of the columnar member 41. Alternatively, as shown in FIG. 8B, the wiring harness may be disposed in a continuous member having a cross section intersecting the longitudinal direction in a substantially U-shape or a channel shape, in other words, the wiring harness may be disposed in a hollow part 42b of a hollow tubular member 42 having an opening 42a along the longitudinal direction. The wiring harness may be configured in which the plurality of covered electric wires 20 are aligned in the width x direction and/or the height y direction in accordance with shapes of the opening 42a and the hollow part 42b. As described above, the heat dissipation sheets may be disposed as appropriate between the aligned covered electric wires 20. Examples of the columnar member 41 and the tubular member 42 include a member used as a reinforcement which is disposed in a front side of an instrument panel of automobiles.

(3) Combination with Other Electric Wires

As described above, the wiring harness according to an embodiment of the present invention may contain the covered electric wires 20 containing the flat electric wire conductor 10 according to an embodiment of the present invention in combination with other kinds of covered electric wires. The covered electric wires 20 according to an embodiment of the present invention and other kinds of covered electric wires may have combination of specific features such as constituent material, shape, and size. Among them, examples may include a configuration using the covered electric wire conductor 20 according to an embodiment of the present invention (i.e., a first covered electric wire) containing the flat electric wire conductor 10 made of aluminum or an aluminum alloy (i.e., aluminum material), and other kinds of covered electric wire (i.e., a second covered electric wire) containing an electric wire conductor made of copper or a copper alloy (i.e., copper material) having a substantially circular cross section, for example, with the flatness lower than the electric wire conductor 10 of the first covered electric wire 20. In this case, it is preferable that a conductor cross-sectional area of the second covered electric wire is smaller than a conductor cross-sectional area of the first covered electric wire 20.

The aluminum material has come to be used as an electric wire conductive material for automobiles instead of the copper material for the purpose of reducing automobile weight; however, as described above, in the case where the aluminum material is used, the conductor cross-sectional area of the electric wire conductor tends to be larger than in the case where the copper material is used, because the aluminum material has a lower electrical conductivity as a material. Thus, if the electric wire conductor made of an aluminum material is used as a conventional conductor having a circular cross section and contained in the wiring harness, a diameter of the electric wire conductor becomes large, which requires a large space for routing the wiring harness; however, the flat electric wire conductor 10 can reduce the space required for routing while ensuring the large conductor cross-sectional area. On the other hand, even the electric wire conductor made of the copper material is used, it does not significantly interfere the weight reduction of automobiles as long as it is a small diameter wire with a small conductor cross-sectional area. Also, it hardly enlarges space required for routing the wiring harness. Accordingly, using the first covered electric wire 20 including the flat electric wire conductor 10 made of the aluminum material in combination with the second covered electric wire including the electric wire conductor having a substantially circular cross section made of the copper material with a smaller conductor cross-sectional area, excellent properties of the copper material such as a high electrical conductivity may be utilized as a property of a part of the wiring harness while ensuring the space-saving property. Suitable examples of the electric wire conductor constituting the second covered electric wire may include a copper alloy thin wire with a conductor cross-sectional area of 0.13 mm$^2$ or smaller. Such a copper alloy thin wire may be suitably used as a signal wire. Forming the second covered electric wire into thin as described above makes it possible to effectively utilize the space-saving property brought about by the flat electric wire conductor 10 contained in the first covered electric wire 20. The relative arrangements of the first covered electric wire and the second covered electric wire are not particularly limited. However, similarly with the arrangement shown in FIGS. 6A to 6C, examples of the relative arrangements include a state in which the plurality of the second covered electric wires having a lower flatness and a smaller conductor cross-sectional area are aligned on the first covered electric wire 20 having a higher flatness and a larger conductor cross-sectional area.

EXAMPLE

Hereinafter, examples according to an embodiment of the present invention are explained. It should be noted that the present invention is not limited by these examples.

[State of Vacancies in Cross section of Electric Wire Conductor]

For across section of an electric wire conductor formed into flat, state of vacancies was investigated.

(Test Method)

A raw wire strand was prepared by twisting aluminum alloy wires having an outer diameter of 0.32 mm to form a conductor cross-sectional area in the range of 2 to 60 mm$^2$ and a substantially circular cross-sectional shape.

The raw wire strand was subjected to pressing with rollers to prepare an electric wire conductor having a substantially rectangular cross section. The pressing with the roller was carried out, as shown in FIG. 3, by firstly applying forces F1 and F2 from upper and lower directions, then applying forces F1' and F2' again from the same directions, and simultaneously applying forces F3 and F4 from both sides of a width direction. In this process, the applying forces were varied to prepare electric wire conductors having different compression ratios (reduction rate of a cross-sectional area) Then, an outer periphery of each electric wire conductor was covered with an insulator containing polyvinyl chloride (PVC) to form a sample of a covered electric wire. The thickness of the insulator was in the range of 0.2 to 2.0 mm depending on the conductor cross sectional area. For example, the thickness of the insulator was 1.5 mm where the conductor cross-sectional area was 60 mm$^2$.

Each of the covered electric wires was embedded in an epoxy-based resin, and a cross section intersecting an axial direction was polished to prepare a cross-sectional sample. Then, the obtained cross-sectional samples were photographed.

Photographic images of the cross sections were subjected to image analysis to evaluate vacancy ratios. In the analysis, a cross-sectional area of the entire electric wire conductor (A0) was estimated from an area of a region inside an outline connecting outlines of elemental wires located at an outermost periphery of the electric wire conductor, and within the above-described region, an area of vacancies (A1) was estimated from an area of a region that was not occupied by the elemental wires. A vacancy ratio (A1/A0×100%) was calculated.

(Test Results)

Figure 9C:
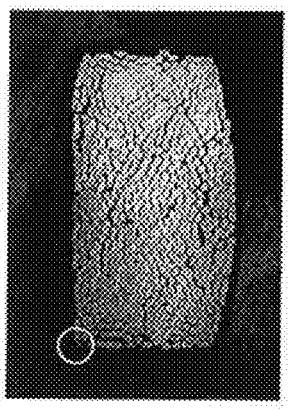
FIGS. 9A to 9F are photographic images of cross sections of the covered electric wires with indication of vacancy ratios.
Figure 9F:
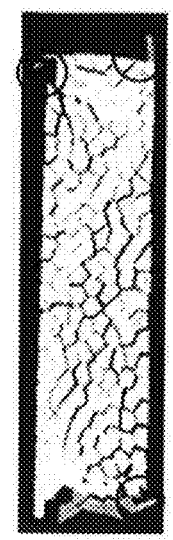
Figure 9B:
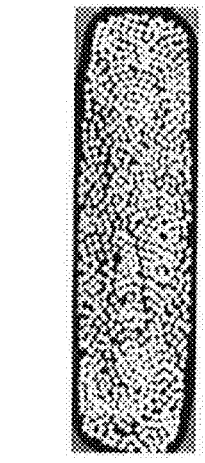
Figure 9E:
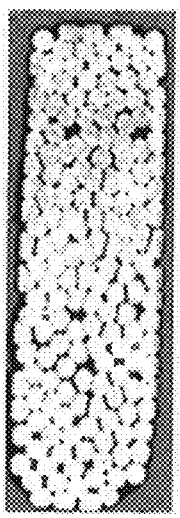
Figure 9A:
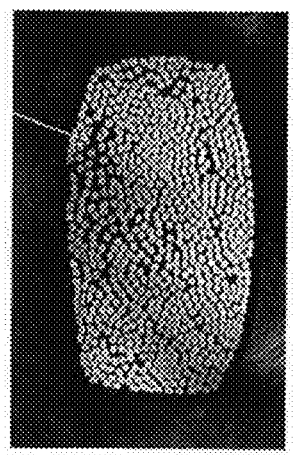
Figure 9D:
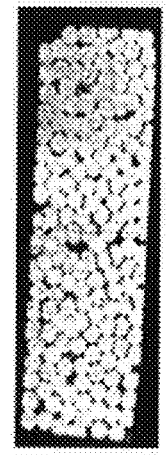

FIGS. 9A to 9F show photographic images of the cross sections of representative samples of the covered electric wires, and values of vacancy ratios. FIGS. 9A to 9C show samples each having the conductor cross-sectional area of 60 mm$^2$, while FIGS. 9D to 9F show samples each having the conductor cross-sectional area of 15=$^2$. The compression ratios were the following order from the lowest in FIGS. 9A to 9C: FIGS. 9A, 9B, and 9C. The compression ratios were the following order from the lowest in FIGS. 9D to 9F: FIGS. 9D, 9E, and 9F.

Comparing the cross-sectional images in FIGS. 9A to 9C, comparatively large vacancies were formed between the elemental wires in FIGS. 9A and 9B, while the elemental wires were densely filled in FIG. 9C. These features were more apparent through the obtained values of vacancy ratios. The vacancy ratio was 20% or higher in FIGS. 9A and 9B, while the vacancy ratio was 20% or lower in FIG. 9C. Comparing FIGS. 9A and 9B, the vacancy ratio was lower in FIG. 9B in which compression was performed at a higher rate.

In addition, in FIG. 9A, as can be seen from the portion pointed by an arrow, many continuous vacancies capable of accommodating two or more of elemental wires were present. In FIG. 9B, continuous vacancies capable of accommodating at least one or more elemental wires were present. In contrast, such large continuous vacancies were hardly found in FIG. 9C.

Further, in FIGS. 9A and 9B, the peripheral parts of the electric wire conductors were formed smoothly, while in FIG. 9C, a sharp burr was produced at end parts in the width direction as indicated by a circle. Thus, it is apparent that an electric wire conductor having a high vacancy ratio allows the conductor to be favorably formed to have a smooth outer surface without burrs.

Also in the samples shown in FIGS. 9D to 9F each having a lower conductor cross-sectional area, the same features as in FIGS. 9A to 9C were observed. That is, as in FIGS. 9D and 9E, where the electric wire conductor has a higher vacancy ratio, the conductor may be favorably formed to have a smooth outer surface without burrs. However, as in FIG. 9F, where the electric wire conductor has a lower vacancy ratio, sharp burrs as indicated by circles were formed at the outer peripheral part.

Figure 10:
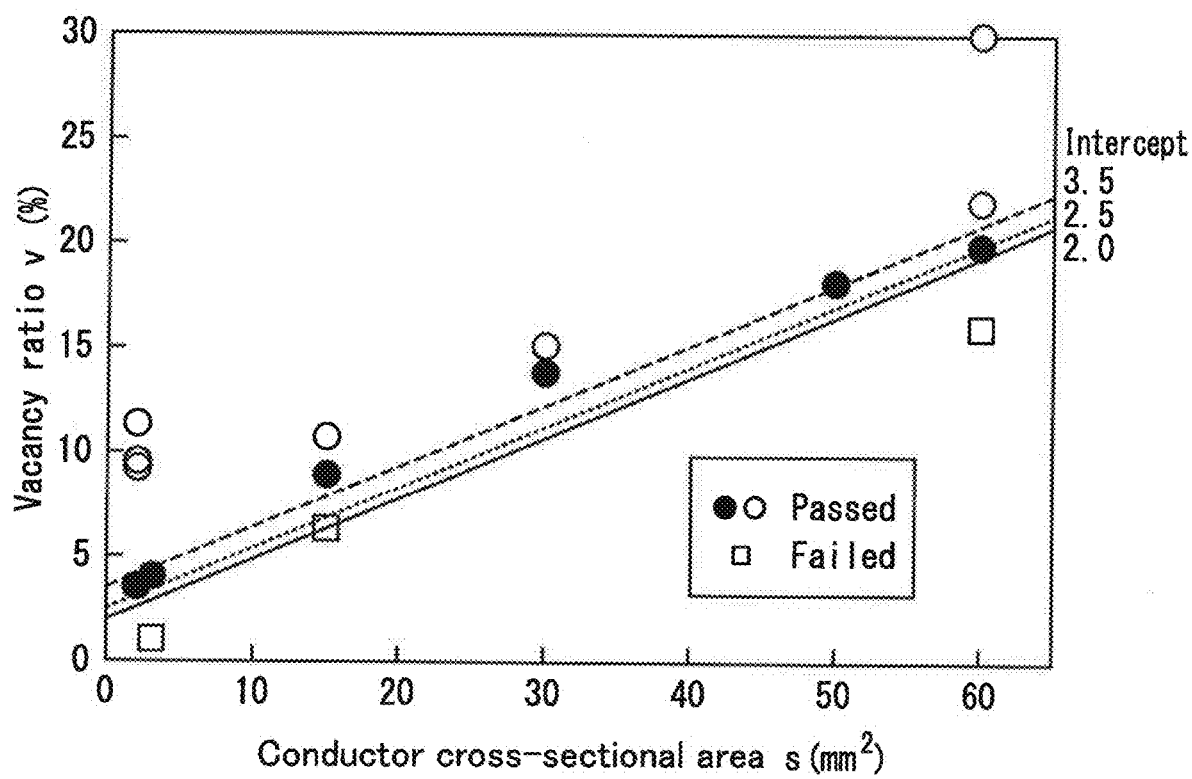
FIG. 10 shows a relation between the conductor cross-sectional area and the vacancy ratio. The circular marks indicate cases where burrs were not formed. The rectangular marks indicate cases where burrs were formed.

Also for electric wire conductors having different conductor cross-sectional areas, a vacancy ratio of the conductor was similarly evaluated in cross section after compression. The results were summarized in FIG. 10. In FIG. 10, the horizontal axis represents a conductor cross-sectional area and the vertical axis represents a vacancy ratio. A sample in which no burrs were formed on the outer periphery of the electrical wire conductor as shown in FIGS. 9A, 9B, 9D and 9E was evaluated as "passed" and indicated with a circle. Among the samples evaluated as "passed", a sample having the lowest vacancy ratio in samples of the same conductor cross-sectional area was indicated by a black circle mark. A sample in which burrs were formed on the outer periphery of the electrical wire conductor as shown in FIGS. 9C and 9F was evaluated as "failed" and indicated by a square mark.

FIG. 10 appears that larger the conductor cross-sectional area (s) of the electric wire conductor is, higher the vacancy ratio (v) required for the covered electric wire to be evaluated as passed becomes. In FIG. 10, linear lines represented by v=0.29 s+A are illustrated. As indicated on the right side of the Figure, intercept A was changed into one of three numbers: A=2.0 (solid line); A=2.5 (dotted line) and A=3.5 (broken line). Failure points (square marks) locate below the linear line wherein A=2.0. Pass points (black circle marks or white circle marks) locate above the linear line wherein A=2.5, and especially the points indicating the lowest vacancy ratio among the respective conductor cross-sectional areas (indicated by black circle marks) are close to the linear line wherein A=3.5

(Distribution of Deformation Ratio of Elemental Wires)

Next, distribution of the deformation ratio of elemental wires was observed for the cross section of the electric wire conductor formed to have a flat cross-sectional shape.

(Test Method)

An electric wire conductor having a flat cross section and consisting of an aluminum alloy was prepared in the same manner as in the test "State of Vacancies in Cross section of Electric Wire Conductor" described above. Further, insulator coverings were provided to prepare a covered electric wire in the same manner as described above. Then, a sample for cross section observation was prepared and cross section of the sample was photographed.

(Test Results)

As for the cross-sectional images obtained through the test for investigating vacancies as described above and shown in FIGS. 9A to 9F, the shapes of the elemental wires located on the peripheral parts and the center part in cross section were compared through visual observation. In FIGS. 9A, 9B, and 9D, the deformation of the elemental wires was apparently smaller at the peripheral parts, especially in a region located at end parts in the width direction than at the center part. Further, when focusing on a region located at end parts of the peripheral part in FIG. 9E, the deformation of the elemental wires was smaller in the region than at the center part. In contrast, in FIGS. 9C and 9F, it was visually confirmed that the deformation of the elemental wires was larger at the peripheral parts than at the center part. Thus, it was confirmed that in the electric wire conductor having a high vacancy ratio and having no burrs at its outer peripheral surface, deformation of the elemental wires was smaller at the peripheral parts than at the inner parts also in portions other than portion where burrs were likely to be formed.

Figure 11A:
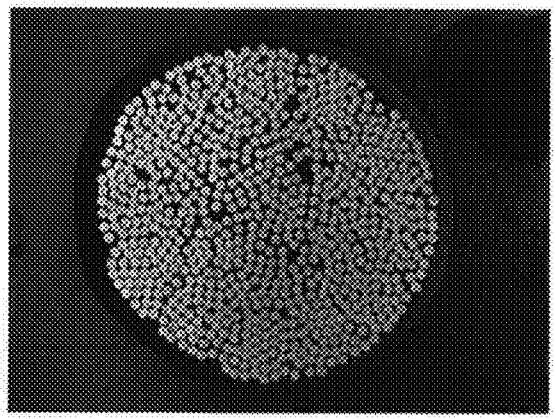
FIGS. 11A to 11E are photographic images of cross sections of the covered electric wires used for evaluation of deformation ratios of the elemental wires, in which regions used for the evaluation are specified.
Figure 11B:
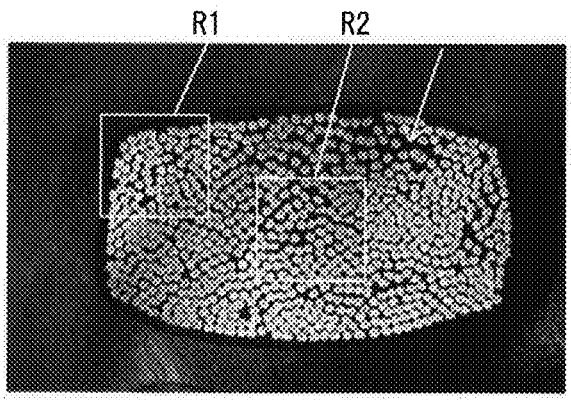
Figure 11C:
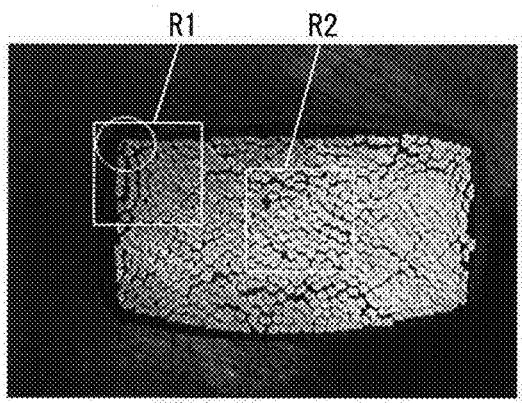
Figure 11D:
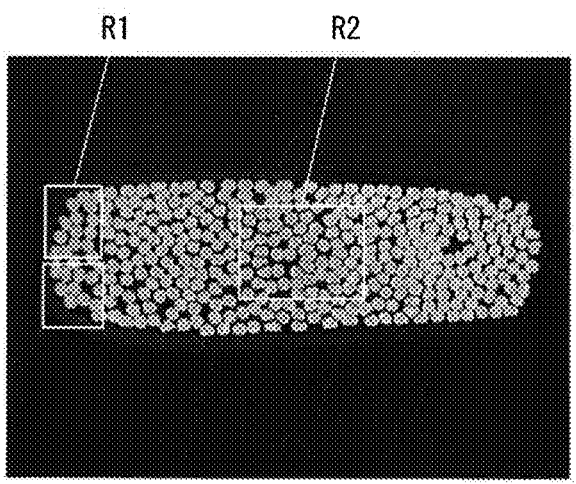
Figure 11E:
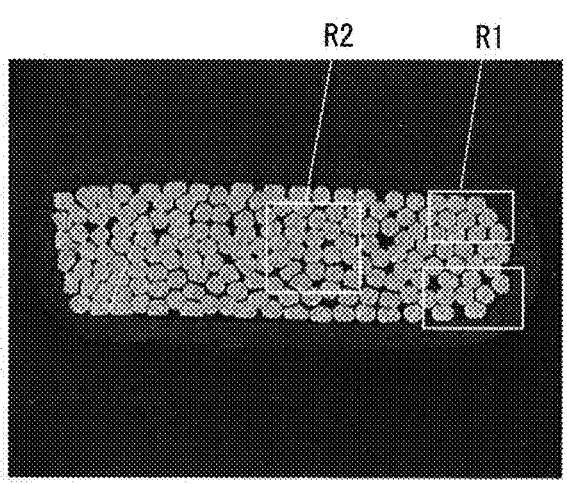

To confirm the tendency, a deformation ratio of the elemental wires of the electric wire conductor was evaluated quantitatively at the peripheral part and the center part and compared. The photographic images shown in FIG. 11A to 11E were used for the evaluation. FIG. 11A shows the cross section of a raw wire strand before compression. FIGS. 11B and 11C show electric wire conductors each having a conductor cross-sectional area of 60 mm² after compression, and show the same samples in FIGS. 9A and 9C, respectively. FIG. 11D shows an electric wire conductor having a conductor cross-sectional area of 30 mm² after compression. FIG. 11E shows an electric wire conductor having a conductor cross-sectional area of 15 mm² after compression. The electric wire conductors in FIGS. 11D and 11E are different samples from the samples shown in FIGS. 9A to 9F, and FIG. 10. In the samples shown in FIGS. 11B, 11D, and 11E, no burrs were formed on the respective outer surfaces, while in the sample shown in FIG. 11C, burrs were formed on the outer surface as indicated by a circle.

Image analysis was performed for each cross-sectional image shown in FIGS. 11B to 11E to obtain a deformation ratio of the elemental wires. In this case, the deformation ratio of the elemental wires was calculated according to the above formula (4). As a diameter R defined as a diameter of a circle, 0.32 mm, the outer diameter of a raw wire strand before compression, was adopted. The deformation ratio of the elemental wires was obtained for the wires located at the peripheral part (end portions) and indicated as a rectangular region R1 in each cross-sectional image, and for the wires located at the center part and indicated as a rectangular region R2 in each cross-sectional image. Then an average deformation ratio was obtained for each region. Further, a peripheral deformation ratio was obtained which is a ratio of the deformation ratio at the peripheral parts to the deformation ratio at the center part (deformation ratio at the peripheral part/deformation ratio at the center part×100%). Table 1 shows thus obtained evaluation results.

TABLE 1

| Figures | Conductor cross-sectional area [mm²] | Deformation ratio of elemental wires | | Peripheral deformation ratio |
|---|---|---|---|---|
| | | Peripheral part | Center part | |
| 11B | 60 | 3.8% | 21% | 18% |
| 11C | | 21% | 21% | 100% |
| 11D | 30 | 19% | 30% | 63% |
| 11E | 15 | 17% | 26% | 65% |

Comparing the evaluation results of FIGS. 11B and 11C having the same conductor cross-sectional area, in photographic images, the cross section of each elemental wire was not significantly deformed from a substantially circular shape before pressed in FIG. 11B, while many elemental wires were significantly deformed from a circular shape in FIG. 11C. According to the results of the image analysis in Table 1, in FIGS. 11B and 11C, the deformation ratios of the electric wire conductors were equal at the center part while they were significantly different at the peripheral part. In FIG. 11B, the deformation ratio was lower at the peripheral part than at the center part, and the deformation ratio at the peripheral part was compressed to 18% with respect to the value at the center part. In contrast, in FIG. 11C, the deformation ratio is the same between the peripheral part and the center part.

Thus, it was confirmed that where a compression ratio was low and no burrs were formed on the electric wire conductor, large vacancies were obtained in cross section and the deformation ratio of the elemental wires was lower at the peripheral part than at the center part. Further, in the electric wire conductors having a small conductor cross-sectional area as shown in FIGS. 11D and 11E, a deformation ratio of the elemental wires was also lower at the peripheral part than at the center part if no burrs were formed on the electric wire conductor.

[Flexibility of Covered Electric Wire]

Influence of a cross-sectional shape of the electric wire conductor to flexibility of the covered electric wire was examined.

(Test Method)

An electric wire conductor having a substantially circular cross section and an electric wire conductor having a flat cross section both consisting of an aluminum alloy were prepared in the same manner as in the test "State of Vacancies in Cross section of Electric Wire Conductor" described above. Further, insulator covering were provided to prepare covered electric wires in the same manner as above. Conductor cross-sectional areas of the electric wire conductors were 35 mm² or 130 mm², respectively. An aspect ratio of the flat cross section was 1:3 for the conductor cross-sectional area of 35 mm², and 1:4 for the conductor cross-sectional area of 130 mm².

For each of the covered electric wires thus prepared, flexibility was evaluated by measuring an opposing force. Three-point bending was carried out for measuring the opposing force. That is, both ends of a covered electric wire having a length of 100 mm were held firmly, and an opposing force incurred by bending a center part was measured with a load cell.

(Test Results)

Table 2 below shows measurement results of the opposing force obtained for each of the covered electric wires.

TABLE 2

| Conductor cross-sectional area | Cross-sectional shape | Opposing force (N) |
| --- | --- | --- |
| 35 mm² | Circular | 32 |
| | Flat (1:3) | 25 |
| 130 mm² | Circular | 102 |
| | Flat (1:4) | 88 |

According to Table 2, for each conductor cross-sectional areas, the opposing force was reduced when the sectional shape was changed from circular to flat. In other words, flexibility was enhanced. Even in the case where the conductor cross-sectional area was as large as 130 mm², flexibility was enhanced by flattening. In each of the conductor cross-sectional areas, the opposing force was reduced to 90% or lower by flattening; however, in the case of the large conductor cross-sectional area, the aspect ratio of the flat shape needs to be higher (width needs to be wider) to improve flexibility to the same degree.

[Heat Dissipation Performance of Covered Electric Wire]

A relationship between a heat dissipation performance of the covered electric wire and the shape of the electric wire conductor as well as presence or absence of a heat dissipation sheet was examined by computer simulations.

(Test Method)

A computer simulation employing a thermal conductivity analysis according to a finite element method was used to estimate a degree of temperature rise upon application of an electric current to a covered electric wire. Specifically, the covered electric wire was assumed as a sample, in which an insulation cover made of PVC having a thickness of 1.6 mm was formed on an outer periphery of three types of the electric wire conductors made of a copper alloy; one had a circular cross section, one had a flat cross section with an aspect ratio of 1:3, and one had a flat cross section with an aspect ratio of 1:5. For the conductor having the circular cross section, a conductor cross-sectional area was set to 134.5 mm², and for the conductor having the flat cross sections, conductor cross-sectional areas were set to have three different values based on 134.5 mm². Then, a current of 400 A was applied to each of the samples and a temperature rise for achieving a steady state was estimated by the simulation. A temperature of the surrounding environment was set at 40 degrees C.

In addition, for the covered electric wire having a flat electric wire conductor with an aspect ratio of 1:5, a temperature rise was similarly estimated also for a case where a heat dissipation sheet was disposed. As the heat dissipation sheet, two types of aluminum plates with a thickness of 5 mm, having a width of 30 mm and 60 mm were employed. A flat surface of the covered electric wire along the width direction x was brought into close contact with a surface of one side of the heat dissipation sheet while aligning the center of the covered electric wire in the width direction x with the center of the heat dissipation sheet in the width direction.

(Test Results)

Figure 12:
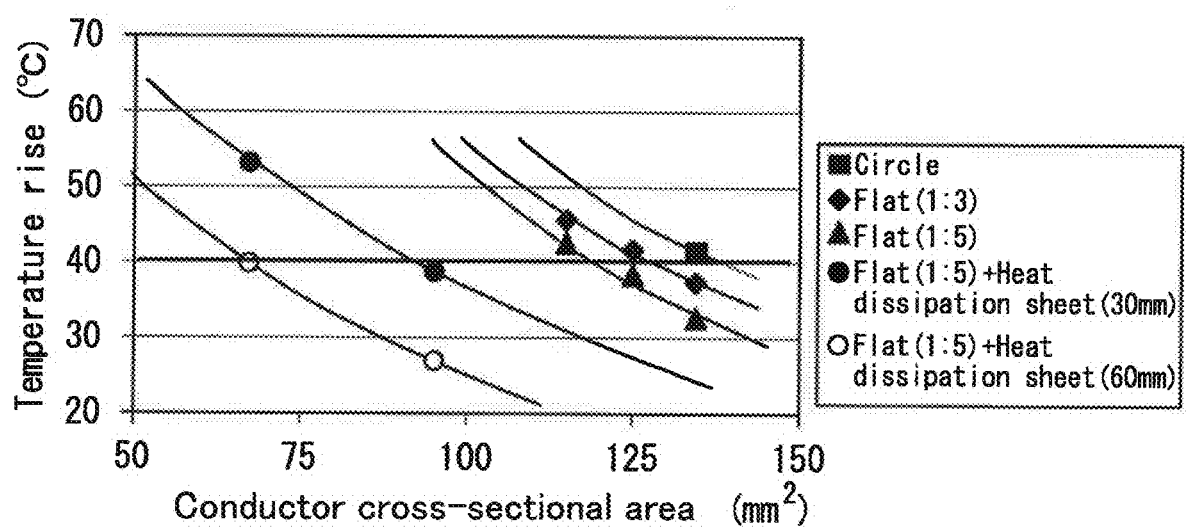
FIG. 12 shows simulation results regarding a temperature rise of the covered electric wires.

Values of temperature rise obtained by the simulation for each of the samples are expressed in FIG. 12 as a function of a conductor cross-sectional area. FIG. 12 also shows approximate curves for the values.

According to FIG. 12, the temperature rise of the electric wire conductor having a flat cross section was kept lower than that of the electric wire conductor having a substantially circular cross section, that is, the heat dissipation performance was enhanced. In particular, as the aspect ratio of the flat shape was increased (the width was increased), the heat dissipation performance was enhanced. As a result, when an upper limit of the temperature rise was set at a predetermined temperature, the temperature rise may be suppressed below the upper limit by forming the cross section of the electric wire conductor into flat and further by making the aspect ratio high, even if the conductor cross-sectional area of the electric wire conductor was made small. For example, when the upper limit of the temperature rise was set at 40 degrees C., a lower limit of the conductor cross-sectional area was, approximately 135 mm² for the circular cross section, approximately 125 mm² for the flat cross section with the aspect ratio of 1:3, and approximately 120 mm² for the flat cross section with the aspect ratio of 1:5.

Further, when the heat dissipation sheet was disposed on the covered electric wire having a flat cross section, the heat dissipation performance was further enhanced. In particular, the larger the cross-sectional area of the heat dissipation sheet was, the higher the heat dissipation performance improved. That is to say, when the upper limit of the temperature rise was set at a predetermined temperature, a heat dissipation sheet having a large cross-sectional area could suppress the temperature rise below the upper limit, even if the conductor cross-sectional area of the electric wire conductor was made small. For example, when the upper limit of the temperature rise was set at 40 degrees C. and a width of the heat dissipation sheet was 30 mm, a lower limit of the conductor cross-sectional area was approximately 95 mm². In this case, the cross-sectional area of the heat dissipation sheet was approximately 1.6 times larger than the conductor cross-sectional area. On the other hand, when the width of the heat dissipation sheet was 60 mm, the lower limit of the conductor cross-sectional area was 67 mm². In this case, the cross-sectional area of the heat dissipation sheet was approximately 4.5 times larger than the conductor cross-sectional area.

[Wear Resistance of Insulator]

Finally, the effects of cross-sectional shape of the electric wire conductor on wear resistance of the insulator were examined for the covered electric wire.

[Test Method]

An electric wire conductor having a circular cross section consisting of an aluminum alloy was prepared in the same manner as in the test of "State of Vacancies in Cross section of Electric Wire Conductor" described above. Cross-sectional area of the electric wire conductor was 15 mm². The electric wire conductor having a circular cross section was compressed to have a flat cross section with an aspect ratio of 1:4.

The outer periphery of the electric wire conductor having a circular cross section and the outer periphery of the electric wire conductor having a flat cross section are both covered with an insulator to form the following three types of samples. In each sample, the covering of the outer periphery of the electric wire conductor with an insulator was performed by extruding polyvinyl chloride.

Sample 1: An insulator was provided on the outer periphery of the electric wire conductor having a flat cross section. The smallest value of the thickness of the insulator covering (the smallest thickness of the insulator) was 0.6 mm.

Sample 2: An insulator was provided on the outer periphery of the electric wire conductor having a circular cross section. The smallest thickness of the insulator was 1.0 mm.

Sample 3: An insulator was provided on the outer periphery of the electric wire conductor having a circular cross section. The smallest thickness of the insulator was 0.6 mm.

For each of samples 1 to 3, the height of the wire was measured (length in the upper and lower direction of the covered electric wire). Further, wear resistance was evaluated by JASO D 618. For the evaluation, apart of each sample of the covered electric wire was cut out to have a length of 1000 mm, and a wear tape #150G was pressed onto the cut-out wire with a pressing load of 1.9 kg. Then, the tape was delivered at the moving speed of 1500 mm/min, and the length of the tape delivered till the electric wire conductor was exposed was measured. The wear resistance was evaluated as excellent "A" where the length of the delivered tape was 635 mm or longer, and the wear resistance was evaluated as fallen "B" where the length of the delivered tape was shorter than 635 mm.

(Test Results)

Figure 13A:
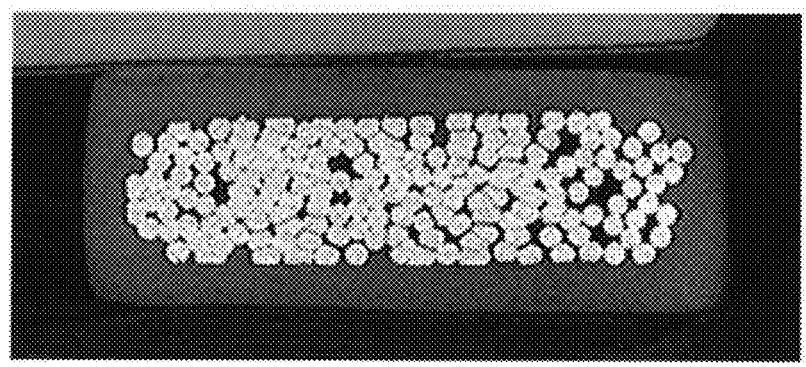
FIGS. 13A to 13C are photographic images of cross sections of samples used for evaluation of wear resistance.
Figure 13B:
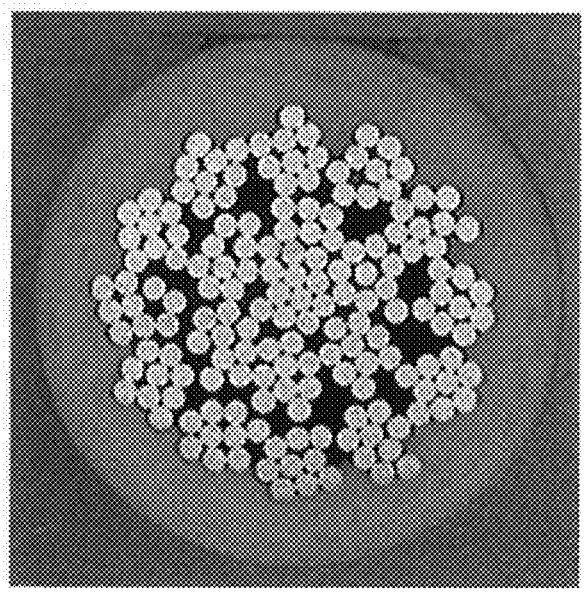
Figure 13C:
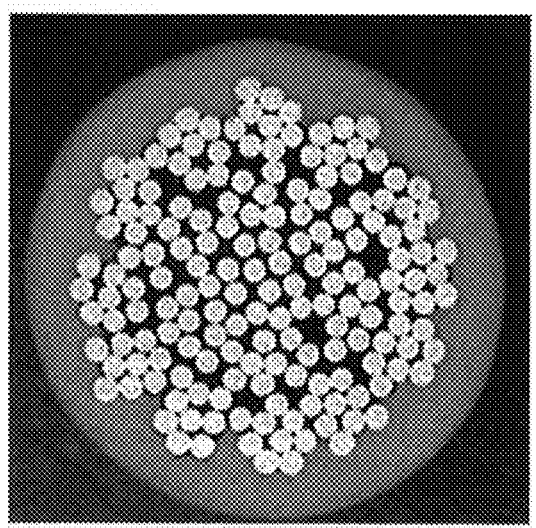

Cross-sectional images of samples 1 to 3 were shown in FIGS. 13A to 13C. The configuration of each sample and the test results are summarized in the below Table 3.

TABLE 3

|  | Sample 1 | Sample 2 | Sample 3 |
| --- | --- | --- | --- |
| Cross-sectional shape of conductor | Flat | Circular | Circular |
| Conductor cross-sectional area |  | 15 mm$^2$ |  |
| Smallest thickness of insulator | 0.6 mm | 1.0 mm | 0.6 mm |
| Height of wire | 3.2 mm | 7.5 mm | 6.7 mm |
| Tape wear test | A | A | B |

When viewing the cross-sectional images in FIGS. 13A to 13C, in Samples 2 and 3 of electric wire conductors each having a circular cross section, the peripheral parts of the conductors were irregular with a degree to accommodate two elemental wires in outer diameter at most due to the shape of the elemental wires. Accordingly, thickness distribution of the insulator provided on the outer periphery of the electric wire conductor was formed for each portion. In contrast, in Sample 1 of an electric wire conductor having a flat cross section, the peripheral part, especially the upper and lower edges, was flat. Accordingly, the insulator covering the outer periphery of the electric wire conductor was formed to have a flat shape, and thickness distribution for each portion of the insulator was small. Through the comparison of samples 1 to 3, it was confirmed that by forming the electric wire conductor to have a flat cross section, the insulator covering is formed to be flat and have high uniformity in thickness with maintaining a predetermined smallest thickness, compared with the circular cross section.

Further, comparing the results of the tape-wear test in Table 3, even though Samples 1 and 3 maintained the same smallest thickness of the conductor, Sample 1 of the electric wire conductor having a flat cross section obtained excellent wear resistance while Sample 3 of the electric wire conductor having a circular cross section could not obtain sufficient wear resistance. It can be construed that where the electric wire conductor had a flat cross section, the insulator provided on the outer periphery of the conductor had a flat surface, had a planer contact with a tape, and a load applied to the insulator could be dispersed, and where the electric wire conductor had a circular cross section, the insulator had a contact with a tape in a small area, and a load applied to the insulator was concentrated on a small area. Sample 2 showed excellent wear resistance even though it had a circular cross section of conductor. However, comparing with Sample 1, the smallest thickness of conductor was larger in Sample 2, and thus the height of the wire was large.

As described above, it was confirmed that by utilizing an electric wire conductor having a flat cross section, a covered electric wire is formed to be flat and have a uniform thickness easily. Consequently, sufficient wear resistance can be effectively obtained with a smallest thickness of an insulator or the thickness of the entire insulator made small, achieving both the space-saving and wear-resistance properties.

Although embodiments of the present invention have been described above in detail, the present invention is not limited to the particular embodiment(s) disclosed herein, and various changes and modifications may be made without deviating from the scope of the present invention.

In addition, an embodiment has been described where the electric wire conductor has the vacancy ratio of equal to or more than a predetermined value; however, an embodiment of the electric wire conductor does not have the vacancy ratio described above may be presented, that is, an electric wire conductor which contains a wire strand having a plurality of elemental wires twisted together, and has a flat portion where a cross section intersecting an axial direction of the wire strand is flat. Also in such an embodiment, forming the cross-sectional shape into flat makes it possible to achieve both the improved flexibility and the space-saving property compared with a case of the substantially circular cross section. Further, also in such an embodiment, the above-mentioned features relating to the electric wire conductor other than the vacancy ratio can be suitably applied, for example, the cross-sectional shape of each elemental wire such as the deformation ratio, the material and the conductor cross-sectional area of the electric wire conductor, the aspect ratio of the electric wire conductor, and arrangement of both the flat portion and the low-flatness portion. Furthermore, also the features relating to the covered electric wire and the wiring harness as described above can be suitably applied.

Especially, even where the flat portion of the electric wire conductor does not have the vacancy ratio as described above, by making the deformation ratio of the elemental wires lower at the peripheral part than at the center part, the flexibility of the conductor may be improved comparing with the case where the deformation ratio of the elemental wires at the peripheral part is equal to or higher than the one at the center part. In such case, favorable values of the parameters related with the deformation ratios of the elemental wires, such as the peripheral part deformation ratio of the elemental wires, and the deformation ratios of the elemental wires at the peripheral part and the center part, are the same as described above.

Even where the vacancy ratio in the entire cross section of the electric wire conductor does not satisfy the relation according to the above formula (1), when the cross section of the conductor contains continuous vacancies capable of accommodating one or more of the elemental wire 1 or continuous vacancies having an area equal to the area of one or more of the elemental wire 1 in cross section, the flexibility of the electric wire conductor can be improved compared with the case where such continuous vacancies are not contained. In such case, favorable values of the parameters related with the shape and the area of the continuous vacancies are the same as described above.

LIST OF REFERENCE NUMERALS

1 Elemental wire
10 Electric wire conductor
10' Raw wire strand
20 Covered electric wire
20A Large cross-section covered electric wire
20B Small cross-section covered electric wire
21 Insulator
H Height of electric wire conductor
H' Height of covered electric wire
W Width of electric wire conductor
x Width direction
y Height direction
31 Heat Dissipation sheet
32 Interposing sheet (Heat Dissipation sheet)
33 Connection member
41 Columnar member
42 Tubular member
51 Interior member
52 Sound absorbing member

The invention claimed is:

1. An electric wire conductor comprising, a wire strand comprising a plurality of elemental wires twisted together,
the conductor having a flat portion where a cross section of the wire strand intersecting an axial direction of the wire strand has a flat shape, wherein
assuming a conductor cross-sectional area of the flat portion as s mm² and a vacancy ratio defined as a ratio of vacancies not occupied by the elemental wires in a cross section of the flat portion as v %, the conductor cross-sectional area and the vacancy ratio satisfies $v \geq 0.29\ s+2.5$, and
the conductor cross-sectional area is 10 mm² or larger.

2. The electric wire conductor according to claim 1, wherein deformation ratios of the elemental wires from a circle in the cross section of the flat portion are lower at a peripheral part facing an outer periphery of the flat portion than at a center part positioned inside of the peripheral part.

3. The electric wire conductor according to claim 1, wherein deformation ratios of the elemental wires from a circle in the cross section of the flat portion at the peripheral part of the flat portion are 65% or lower of the deformation ratios of the elemental wires at a center part of the flat portion.

4. The electric wire conductor according to claim 1, wherein deformation ratios of the elemental wires from a circle in the cross section of the flat portion at the peripheral part of the flat portion are 20% or lower.

5. The electric wire conductor according to claim 1, wherein the cross section of the flat portion comprises a continuous vacancy capable of accommodating one or more of the elemental wires.

6. The electric wire conductor according to claim 1, wherein the cross section of the flat portion includes opposing edges along a width direction of the flat shape being parallel to each other; and
deformation ratios of the elemental wires from a circle in the cross section of the flat portion are lower at end parts of the opposing edges of the flat portion than at a center part of the flat portion.

7. The electric wire conductor according to claim 1, the electric wire conductor comprising the flat portion and a low-flatness portion having a flatness lower than the flat portion, the flat portion and the low-flatness portion continuously disposed in the axial direction.

8. The electric wire conductor according to claim 1, wherein the number of the elemental wires contained in the wire strand is 50 or more.

9. The electric wire conductor according to claim 1, wherein deformation ratios of the elemental wires from a circle in the cross section of the flat portion at the center part of the flat portion are 10% or higher.

10. The electric wire conductor according to claim 1, wherein an aspect ratio of the flat shape in the cross section of the flat portion is within a range of 1:2 to 1:8.

11. A covered electric wire comprising:
the electric wire conductor according to claim 1; and
an insulator covering the electric wire conductor.

12. A wiring harness comprising the covered electric wire according to claim 11.

13. The wiring harness according to claim 12 comprising a plurality of the covered electric wires comprising the electric wire conductor and an insulator covering the electric wire conductor, wherein the plurality of the covered electric wires are aligned along at least one of a width direction of the electric wire conductor and a height direction intersecting the width direction.

14. The wiring harness according to claim 13 further comprising at least one of a heat dissipation sheet disposed between the plurality of the covered electric wires and a heat dissipation sheet commonly contacting the plurality of the covered electric wires.

15. The wiring harness according to claim 13, wherein the plurality of the covered electric wires are aligned at least along the height direction.

16. The wiring harness according to claim 15 comprising:
interposing sheets made of a heat dissipation material disposed between the plurality of the covered electric wires aligned along the height direction; and
a connection member made of a heat dissipation material connecting the interposing sheets mutually.

17. The wiring harness according to claim 13, wherein
the plurality of the covered electric wires are aligned at least along the width direction,
the insulator is made of insulation films and bonded each other by fusion or by adhesive while sandwiching the electric wire conductors aligned along the width direction all together in between the height direction, and
the electric wire conductors are insulated mutually by the insulation film or the adhesive.

18. The wiring harness according to claim 13 comprising a large cross-section covered electric wire and a plurality of small cross-section covered electric wires each having a cross-sectional area smaller than the large cross-section covered electric wire as the covered electric wire comprising the electric wire conductor and an insulator covering the electric wire conductor,
wherein the small cross-section covered electric wires have a uniform height, and wherein the large cross-section covered electric wire and the small cross-section covered electric wires are stacked in the height direction with the small cross-section covered electric wires are aligned along the width direction.

19. The wiring harness according to claim 12 comprising a first covered electric wire and a second covered electric wire, wherein the first covered electric wire comprises the covered electric wire comprising the electric wire conductor and an insulator covering the electric wire conductor, comprising the electric wire conductor made of aluminum or an aluminum alloy, and the second covered electric wire comprises an electric wire conductor made of copper or a copper alloy having a lower flatness and a smaller cross-sectional area than the electric wire conductor of the first covered electric wire.

20. The wiring harness according to claim 19, wherein the conductor cross-sectional area of the second covered electric wire is 0.13 mm$^2$ or smaller.

21. An electric wire conductor, comprising a wire strand comprising a plurality of elemental wires twisted together, the conductor having a flat portion where a cross section of the wire strand intersecting an axial direction of the wire strand has a flat shape, wherein assuming a conductor cross-sectional area of the flat portion as s mm$^2$ and a vacancy ratio defined as a ratio of vacancies not occupied by the elemental wires in a cross section of the flat portion as v %, the conductor cross-sectional area and the vacancy ratio satisfies v>0.29 s+2.0, and deformation ratios of the elemental wires from a circle in the cross section of the flat portion is lower at a peripheral part facing an outer periphery of the flat portion than at a center part positioned inside of the flat portion.

* * * * *